United States Patent
Mathews et al.

(10) Patent No.: US 7,511,662 B2
(45) Date of Patent: Mar. 31, 2009

(54) SYSTEM AND METHOD FOR POSITIONING IN CONFIGURED ENVIRONMENTS

(75) Inventors: Michael B. Mathews, Kirkland, WA (US); Kenn L. Gold, Colorado Springs, CO (US); Peter F. MacDoran, Sanford, FL (US)

(73) Assignee: Loctronix Corporation, Woodinville, WA (US)

( * ) Notice: Subject to any disclaimer, the term of this patent is extended or adjusted under 35 U.S.C. 154(b) by 0 days.

(21) Appl. No.: 11/697,575

(22) Filed: Apr. 6, 2007

(65) Prior Publication Data

US 2007/0257831 A1 Nov. 8, 2007

Related U.S. Application Data

(60) Provisional application No. 60/745,928, filed on Apr. 28, 2006.

(51) Int. Cl.
*H04B 7/185* (2006.01)
(52) U.S. Cl. .................................. 342/357.14
(58) Field of Classification Search .......... 342/350–358
See application file for complete search history.

(56) References Cited

U.S. PATENT DOCUMENTS

| | | |
|---|---|---|
| 4,170,776 A | 10/1979 | MacDoran et al. |
| 4,215,345 A | 7/1980 | MacDoran et al. |
| 4,463,357 A | 7/1984 | MacDoran |
| 4,667,203 A | 5/1987 | Counselman, III |
| 4,754,283 A | 6/1988 | Fowler |
| 4,797,677 A | 1/1989 | MacDoran et al. |
| 4,862,178 A | 8/1989 | Sturza et al. |
| 4,928,106 A | 5/1990 | Ashjaee et al. |
| 4,970,523 A | 11/1990 | Braisted et al. |
| 4,998,111 A | 3/1991 | Ma et al. |
| 5,008,610 A | 4/1991 | Nelson et al. |

(Continued)

FOREIGN PATENT DOCUMENTS

EP     0732596     9/1996

(Continued)

OTHER PUBLICATIONS

C. Walker, VLBI, Synthesis Imaging Summer School 2002, http://www.aoc.nrao.edu/events/synthesis/2002/WalkerVLBI.pdf, p. 1-8, 2002.*

(Continued)

*Primary Examiner*—Thomas H Tarcza
*Assistant Examiner*—Fred H Mull
(74) *Attorney, Agent, or Firm*—Black Lowe & Graham, PLLC

(57) ABSTRACT

The present invention relates to a system and method for providing location determination in a configured environment in which Global Navigation Satellite System Signals may not be available. In this regard, local beacon systems generate spread spectrum CDMA signals that are received by spectral compression units that derive physically meaningful observations without a requirement for correlation of the intercepted energy by means of the known spreading codes. The invention can coexist with communication assets already in place, and the design allows for self calibration, which simplifies installation and usage. The invention has utility in applications in which GNSS signals are unavailable or limited, for example, in warehouse inventory management, in search and rescue operations and in asset tracking in indoor environments.

36 Claims, 21 Drawing Sheets

U.S. PATENT DOCUMENTS

| | | | |
|---|---|---|---|
| 5,014,066 A | 5/1991 | Counselman, III | |
| 5,056,106 A | 10/1991 | Wang et al. | |
| 5,347,285 A * | 9/1994 | MacDoran et al. | 342/357.12 |
| 5,619,212 A | 4/1997 | Counselman, III | |
| 5,757,916 A | 5/1998 | MacDoran et al. | |
| 5,821,898 A | 10/1998 | Eerola et al. | |
| 5,831,574 A | 11/1998 | Krasner | |
| 5,841,396 A | 11/1998 | Krasner | |
| 5,874,914 A | 2/1999 | Krasner | |
| 5,884,214 A | 3/1999 | Krasner | |
| 5,887,020 A | 3/1999 | Smith et al. | |
| 5,899,957 A | 5/1999 | Loomis | |
| 5,940,006 A | 8/1999 | MacLellan et al. | |
| 6,002,363 A | 12/1999 | Krasner | |
| 6,016,119 A | 1/2000 | Krasner | |
| 6,104,815 A | 8/2000 | Alcorn et al. | |
| 6,263,279 B1 * | 7/2001 | Bianco et al. | 342/357.08 |
| 6,449,558 B1 | 9/2002 | Small | |
| 6,489,923 B1 | 12/2002 | Bevan et al. | |
| 6,512,478 B1 | 1/2003 | Chien | |
| 6,661,372 B1 | 12/2003 | Girerd et al. | |
| 6,778,130 B1 | 8/2004 | Bevan et al. | |
| 6,943,725 B2 | 9/2005 | Gila et al. | |
| 7,009,561 B2 | 3/2006 | Menache et al. | |
| 7,372,839 B2 | 5/2008 | Relan et al. | |
| 7,379,729 B2 | 5/2008 | Holland et al. | |
| 2003/0006878 A1 | 1/2003 | Chung | |
| 2003/0058163 A1* | 3/2003 | Zimmerman et al. | 342/357.08 |
| 2004/0048579 A1 | 3/2004 | Becker et al. | |
| 2004/0178955 A1* | 9/2004 | Menache et al. | 342/463 |
| 2004/0179547 A1 | 9/2004 | Kuffner et al. | |
| 2005/0001742 A1 | 1/2005 | Small | |
| 2005/0134440 A1 | 6/2005 | Breed | |
| 2005/0215269 A1 | 9/2005 | Cheok et al. | |
| 2005/0248454 A1 | 11/2005 | Hanson et al. | |
| 2005/0250469 A1 | 11/2005 | Laroia et al. | |
| 2006/0012521 A1 | 1/2006 | Small | |
| 2006/0050625 A1 | 3/2006 | Krasner | |
| 2006/0232467 A1 | 10/2006 | Small | |
| 2007/0040739 A1 | 2/2007 | Small | |
| 2007/0041427 A1 | 2/2007 | Small | |
| 2007/0058591 A1 | 3/2007 | Lamance et al. | |
| 2007/0100548 A1 | 5/2007 | Small | |
| 2007/0257831 A1 | 11/2007 | Mathews et al. | |

FOREIGN PATENT DOCUMENTS

| | | |
|---|---|---|
| EP | 0732596 A2 * | 9/1996 |
| WO | 9913352 | 3/1999 |
| WO | 9963358 | 12/1999 |

OTHER PUBLICATIONS

S.V. Pogrebenko et al., VLBI tracking of the Huygens Probe in the atmosphere of Titan, International Workshop on Planetary Probe Atmospheric Entry and Descent Trajectory Analysis and Science, p. 1-18, Oct. 2003.*

M. Poirier, Westford Antenna, IVS 2003 Annual Report, http://amelia.db.erau.edu/nasacds/200410Disc2/research/20040139433_2004144827.pdf, p. 98-101, 2003.*

M.G. Tomasko et al., Rain, winds and haze during the Huygens probe's descent to Titan's surface, Nature, vol. 438(8), p. 765-778, Dec. 2005.*

MacDoran, "Radio Interferometry for International Study of the Earthquake Mechanism," Acta Astronautica, vol. 1, pp. 1427-1444, 1974.

MacDoran et al., "Codeless GPS System for Positioning of Offshore Platforms and 3D Seismic Surveys," Navigation Journal of the Institute of Navigation, vol. 31. No. 2. 1984.

MacDoran, "Satellite Emission Road Interferometric Earth Surveying Series—GPS Geodetic System," Bull. Geod. 53, 99. 117-138, 1979.

MacDoran et al., "Operational Expendable GPS Sensors for Earth Observation," GPSonde Ion Paper, pp. 1619-1625, 1994.

* cited by examiner

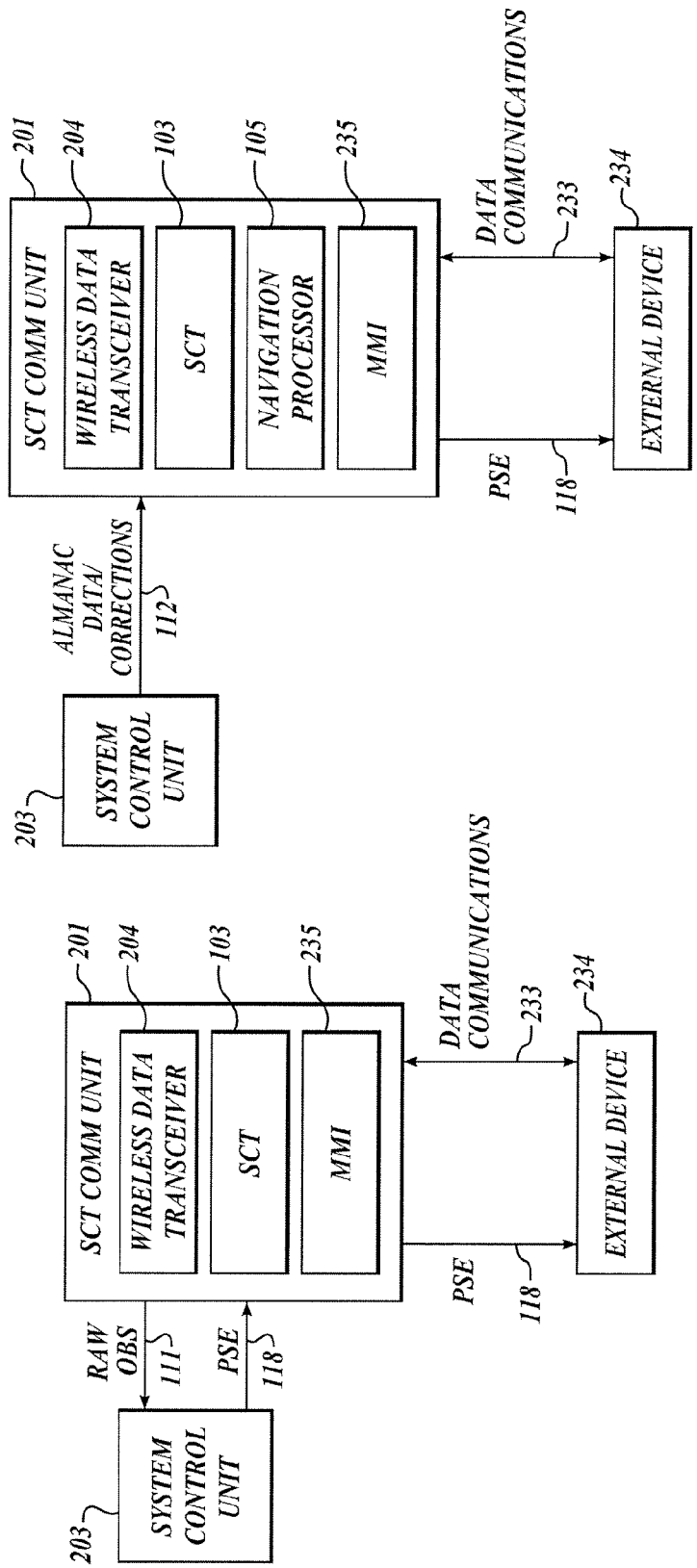

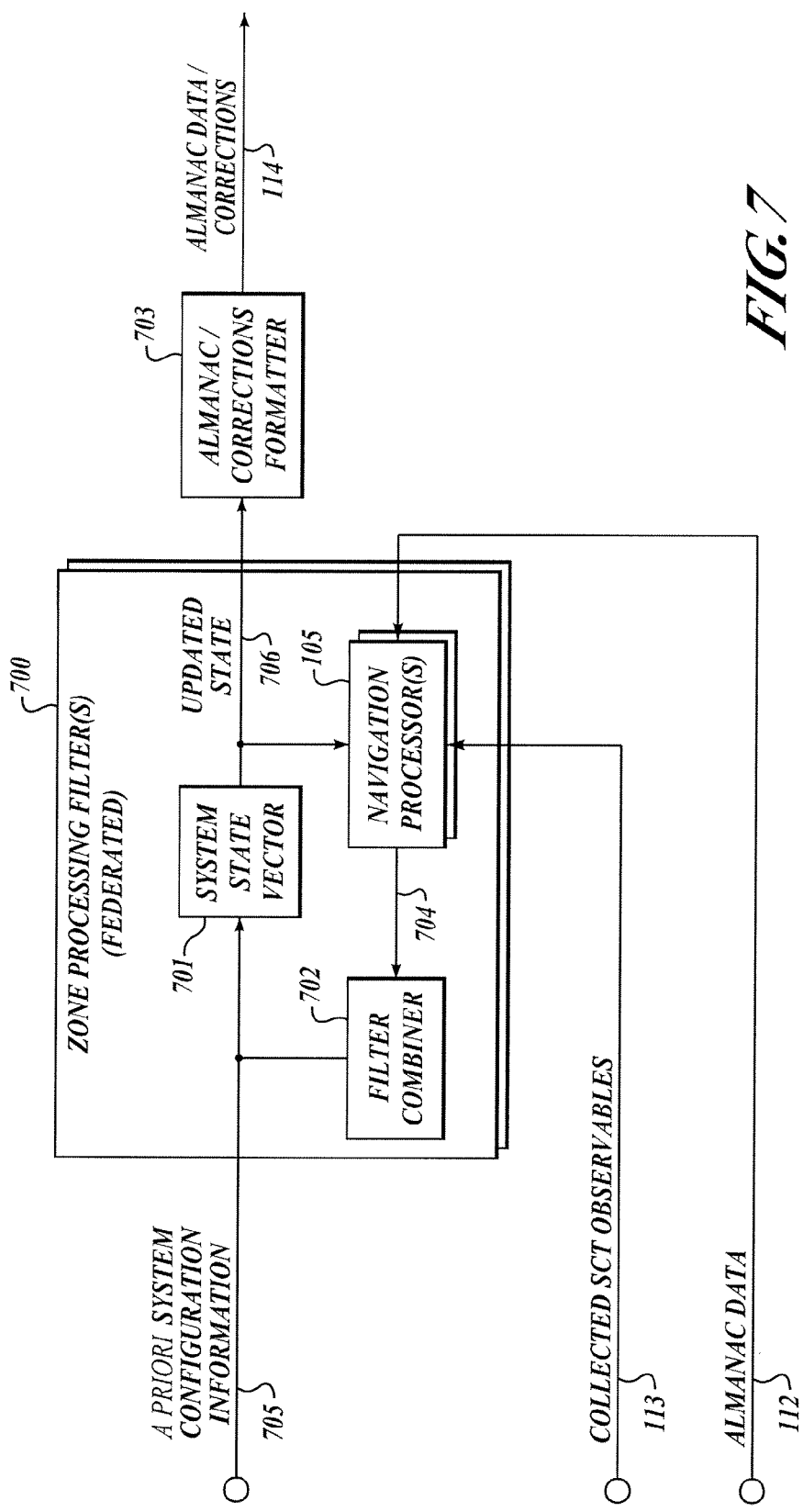

SYSTEM AND METHOD FOR POSITIONING IN CONFIGURED ENVIRONMENTS

PRIORITY CLAIM

This application claims priority to U.S. Provisional Application No. 60/745,928, filed Apr. 28, 2006, which application is hereby incorporated by reference in its entirety as if fully set forth herein.

FIELD OF THE INVENTION

The invention generally relates to a system and method for positioning remote assets and, more particularly, to a system and method for operating in a local environment where a global navigation satellite system (GNSS) is not available.

BACKGROUND OF THE INVENTION

The global positioning system (GPS) has fundamentally changed the methods of navigation, location tracking, and time synchronization worldwide. With thirty-two satellites on orbit, the GPS provides continuous positioning service at almost anyplace signals can be received. With the advent of low-cost positioning sensors using GPS, accurate to a few meters, there has been a proliferation of the technology into core infrastructures including power systems, communications, transportation, and military. The importance of this capability as a national asset cannot be overstated and is highlighted by the fact that many other nations are now either operating or developing their own GNSS, including Russia, Japan, China and the European Union.

Despite its many advantages, GNSS has one significant drawback: satellite-based navigation systems signals are typically very weak as they reach the positioning receiver. In some cases, like the GPS, this is a key part of its design, but practically it is difficult to operate high power transmitters on orbit. These weak signals make it difficult to operate positioning receivers in obstructed environments, such as indoors, as the obstructions will tend to attenuate the signal power and render it useless for positioning or, at the very least, substantially degrade the overall measurement capability.

While significant effort has been made to overcome these limitations, particularly Assisted GPS and High-Sensitivity GPS, in practical teens meter level positioning in obstructed environments using GNSS is not feasible for broad usage. To provide positioning in obstructed environment another class of positioning technologies has been developed known as real time locating systems (RTLS), which derive from radio frequency identification (RFID) technologies.

Using a variety of ranging methods, such as time difference of arrival (TDOA), Received Signal Strength (RSS), fixed reader, and landmark tagging, RTLS offers a variety of positioning capabilities and accuracies. The most advanced and versatile systems tend to use TDOA and can offer positioning accuracy to within a few meters. Some of the systems even claim sub-meter accuracy, though this tends to be in highly controlled environments.

While promising, RTLS systems are very expensive to install and operate. When high accuracy is needed, the cost and complexity of the equipment can make it all but impractical except for a few limited applications. RTLS offers a variety of solutions that can be tailored to fit a variety of applications; however, when compared to the relative simplicity and wide availability of GNSS based positioning they all are less than desirable.

Further, for combined applications requiring positioning in both local area obstructed and wide area unobstructed environments, options are extremely limited as neither GNSS nor RTLS can satisfy the requirement alone. Combined RTLS and GNSS systems are impractical due to the fact that they are largely incompatible and are difficult to integrate and, as a result, very expensive. Several attempts have been made to adapt commodity GPS receiver technologies using pseudolites to provide RTLS capabilities. While attractive in concept, these solutions are at best too expensive and power intensive to be practical in addressing many of the RTLS applications and at worst they are illegal to operate in much of the world as they tend to jam normal GPS operations.

Accordingly, there is a need for a cost effective, highly accurate positioning technology that operates equally well in obstructed environments using locally deployed beacon reference points and can utilize GNSS reference points such as a GPS satellite for wide area unobstructed environments.

SUMMARY OF TERMS

The following definitions of certain terms are useful to provide a foundation for the discussion of the preferred and alternative embodiments of the present invention.

"Almanac" means information describing the configuration, current physical state, or predicted future physical state of a reference point or physical state sensor. This information may be internally generated by a reference network processor or be provided by an external source (e.g. GPS receiver for GPS almanac and precision ephemeris). Typically almanac information has a time of applicability and is stored in a format that makes it relatively easy to use for physical state estimation.

"Almanac correction" means corrections to almanac information. These corrections are typically adjustments to one or more elements of an almanac and are more compact in size when compared to a full almanac record thus reducing bandwidth and storage requirements.

"Configuration data" means information that defines the system configuration and relationship to external references. Configuration data includes specifications of reference points, coordinate system transformations, and external time transformation data. The system information may also include security attributes, physical state sensor registrations and specifications of integrity performance criteria.

"Coordinate system fiducial reference" means a known or accepted location in the coordinate system frame of reference that is determined to accuracy better than the accuracy of the system end-user performance requirement.

"Differential observables" means the observables that are formed whenever observables from two or more interceptors are differenced producing a differential measurement that effectively cancels the systematic errors due to the uncertainties in the physical state of an emitter. Note that there are $1^{st}$, $2^{nd}$, and higher differenced observables. The preferred embodiment typically uses first differences.

"Emitter" means any object that produces an energy emission.

"Energy emission" means structured or unstructured energy propagated in some transmission medium that can be intercepted and processed. Structured emissions include any emissions whose characteristics are known and are deterministic and predictable in some manner. Unstructured emissions are anything that are not considered structured and typically have random characteristics.

"Interceptor" means any object capable of intercepting at least one energy emission.

"Location sensor" means a physical state sensor configured to produce observables useful to the determination of position.

"Navigation processor" means a physical state estimator configured to process observables for at least one physical state sensor resulting in an estimate of the physical state of the physical state sensor. Physical state estimation can be implemented by any number of means. The preferred embodiment uses a combination of stochastic estimation methods including least squares, Kalman filtering, and hybrid methods.

"Observable" means a measurement of the intercepted energy propagated in some transmission medium between emitters and interceptors.

"Physical state" means the physical characteristics relative to a reference frame of a device comprised of at least one or more of the following: position, attitude, clock and temporal derivatives. Position and attitude may be in one, two, or three dimensions. Position is a measurement of linear distance along one or more axes. Attitude is a measurement of an angular rotation about some axis. Clock is the measurement of time. Temporal derivatives are the time derivatives of the primary physical characteristics.

"Physical state estimate" or "PSE" means a computed estimate of physical state derived from observables.

"Physical state estimator" means a system element that processes observables given previously defined configuration data producing a physical state estimate.

"Physical state sensor" means a system element that is used to sense the physical state. The physical state sensor may be an energy interceptor or an emitter depending upon the configuration.

"Reference point" means a system element acting as a point of reference for measuring position of one or more location sensor(s). A reference point element can be either an emitter or a receiver of energy propagated in some transmission medium. They can be placed at known fiducial points within the coordinate system reference frame. Reference points can also be moving, or of external origin such as quasars, satellite signals of opportunity, and any other emitter of energy. The primary characteristic of reference point is that one or more physical characteristics are known prior to estimation of the relative physical state between the reference point and a physical state sensor.

"Ranging signal" means a structured energy emission purposefully designed to have appropriate characteristics to be useful in measuring the range between an emitter and an interceptor.

"Ranging signal transmitter" or "RST" means an emitter that transmits a ranging signal. This can be a global navigation satellite, a local beacon, or any transmitter that produces a signal that can be exploited as a ranging signal.

"Reference network processor" means a physical state estimator configured to estimate the physical state for at least one reference point with respect to a second reference point and subsequently using the resulting physical state information to update almanac and corrections information and other related configuration data for the system "Reference SCT" means a spectral compressor and translator that is designated as a reference point in the system.

"Spectral compressor and translator" or "SCT" means a physical state sensor configured as an interceptor that processes intercepted energy emissions using at least one method of spectral compression producing observables that can be used for physical state estimation.

"Spectral compression" means a process of extracting changing physical characteristics in the form of amplitude, phase and temporal derivatives of the intercepted energy as it propagates through a transmission medium without regard to the preservation of information content potentially modulated within the energy emissions. The process of extraction utilizes at least one or more known physical characteristics of the energy emission and emitter to distill wideband spectral content into a narrowband regime, which preserves the physical characteristics. The distillation of wideband spectral content can be performed without regard to modulated information content, enabling effective process gain that yields high signal to noise ratio for extraction of the physical characteristics.

"System controller" means a system element (typically software) that has the responsibility to coordinate system operations managing configuration, calibration, and coordinating the flow of information to other elements in the system. The system controller implements timing and control functions needed to coordinate other system functions to provide a certain performance and quality of service. Note these functions may be physically implemented in a single controller or distributed/shared amongst a group of controllers depending on specific implementation requirements.

"Time reference" means an external signal that provides external time and frequency information that is useful for synchronizing the system s time and frequency reference. One of the most common external time references is universal time coordinated (UTC) and GPS time, enabling the system time and frequency references to be linked to those specified systems.

"Transmission medium" means any medium capable of propagating energy in some form; mediums include free space, liquids, solids and gases.

SUMMARY OF THE INVENTION

The present invention provides a system and method for determining the physical state and principal position of a physical state sensor relative to known reference points that may include both global navigation satellites (e.g. global positioning system (GPS)) and local beacons such that proper coverage is provided even when the global navigation satellite system (GNSS) is not available or otherwise obstructed. The invention presents a system and method for a beacon-based local area location system utilizing RF (or other signals) to provide ranging signals to one or more location sensors.

An exemplar embodiment of the system of the present invention for providing physical state information within a configured environment includes at least one emitter that emits energy within a transmission medium; at least one interceptor that receives energy propagated through a transmission medium from the emitter, wherein the interceptor is configured to process the received emissions using spectral compression to produce a set of observables suitable for physical state estimation. The system communicates the set of observables to a physical state estimator, which is configured to determine a member of the relative physical state between the interceptor and emitter based on the set of observables received from the interceptor. The system then reports determined member of the relative physical state based on the set of observables received from the interceptor.

An exemplar embodiment of the method of the present invention for providing physical state information within a configured environment includes the steps of emitting energy from at least one emitter through a propagation medium; intercepting the energy emission at the interceptor; processing the received energy emission using spectral compression to produce a set of observables associated with the emission;

communicating the set of observables to a physical state estimator; receiving configuration data pertaining to the deployment and configuration of the emitter and interceptor within the configured environment; determining a member of the relative physical state between the interceptor and emitter based on the set of observables and the configuration data; and reporting the member of the relative physical state.

The resulting alternative embodiments of the present invention overcome the disadvantages associated with current systems and methods and provide a cost effective, simple to implement and rapidly deployable system with a complete stand alone method for physical state estimation using either local area beacons and/or wide area GNSS satellites such as GPS.

BRIEF DESCRIPTION OF DRAWINGS

Preferred and alternative embodiments of the present invention are described in detail below with reference to the following drawings.

FIGS. 2C and 2D illustrate the block level components of the spectral compressor and translator integrated with communication assets in accordance with an embodiment of the present invention.

FIG. 7 shows the process of federated filtering to generate a reference correction data set in accordance with an embodiment of the present invention.

DETAILED DESCRIPTION OF THE PREFERRED EMBODIMENT

Figure 1:
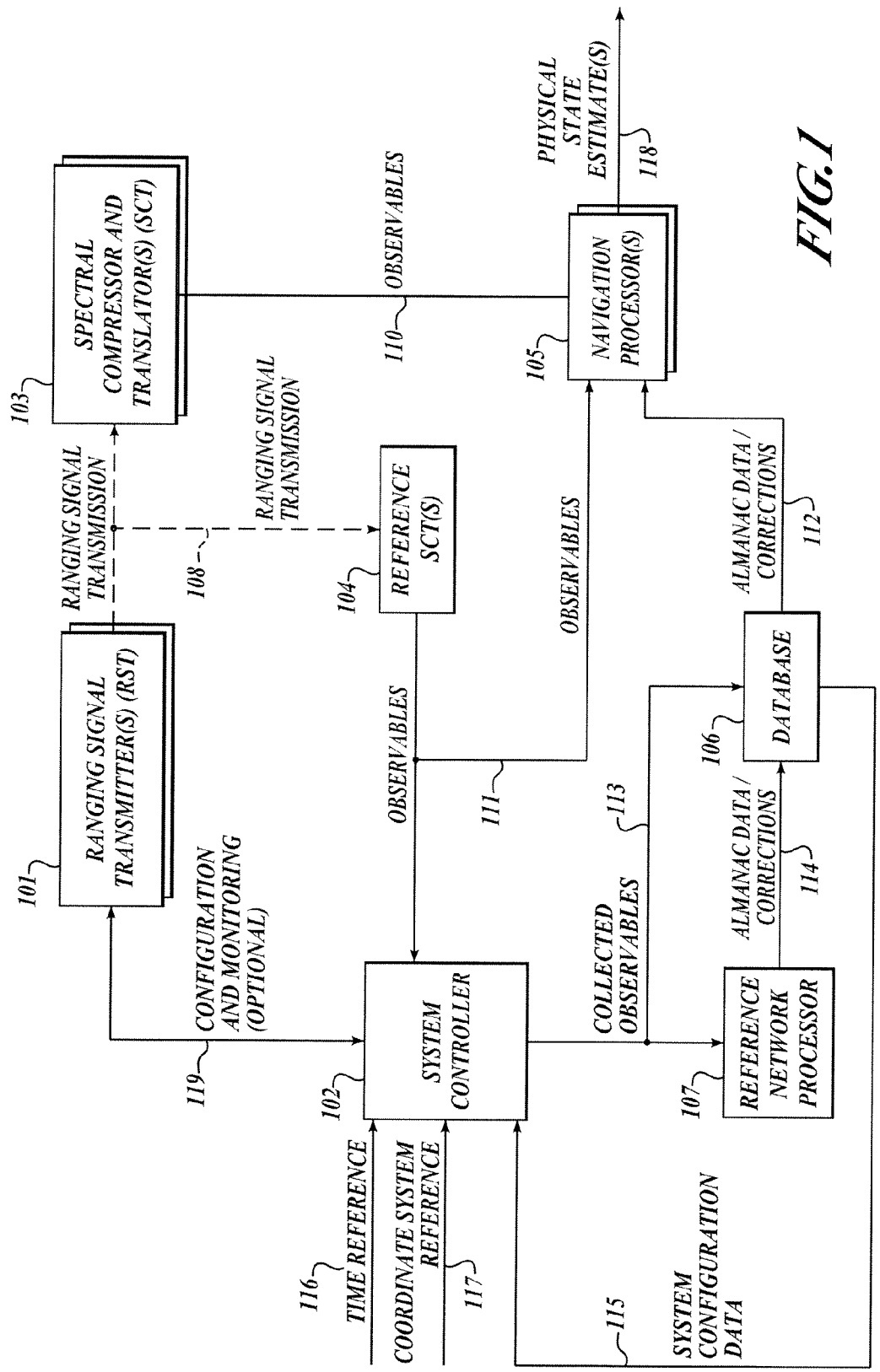
FIG. 1 is a logical systems diagram showing the components of the invention including ranging signal transmitters, spectral compressor and translators and the processing components to determine the physical state using intercepted energy in accordance with an embodiment of the present invention.

There are situations in which a GNSS implementation for determining the physical state of some sensor is impractical because the satellites signals are either too weak, obstructed or interfered with by accident or intent. Such situations can occur in an enclosed space such as within a metal constructed warehouse, below ground/rubble, or possibly GNSS jamming environments.

By way of overview, the present invention utilizes a beacon constellation environment, which although low in transmitter power (<1 microwatt), provides signal flux that is 40 to 60 dB more powerful than GNSS signals and thus is able to determine the physical state of a sensor in missions where GNSS is either absent or unreliable in the context of a configured environment or, in other words, an environment in which there is the ability to deploy a beacon constellation in a manner that affords the maximum of flexibility for the system operator. The constellation of beacons uses spread spectrum techniques without the need for time and frequency synchronization while achieving sufficiently stable frequency control to identify a beacon individually by its frequency offset. Such beacon constellations could be in terrestrial, marine, air or space environments.

For example, in a terrestrial situation where interference, by accident or intent, has rendered the GPS (a type of GNSS) unavailable, unmanned aerial vehicles, UAVs, balloon-borne or rocket/parachute beacon deployments may be used. Spectral compression modes are preferably used within the GNSS sensors with high dynamic range digital sampling to tolerate residual interference at altitude. In this embodiment, the spectral compression GNSS data are down linked via a communications channel or, alternatively, imbedded within the beacon spectrum. In this manner, the dynamic physical state of these airborne beacons can be determined.

Beacons are devices that emit a loosely constrained signal structure that are configured to simplify the overall design to minimize cost of an intercepting device, minimize data cross-link requirements and simplify physical state estimators. The concept of these beacons is not constrained to operate in any one emission modality. In alternative embodiments, these beacons operate in several physical domains such as electromagnetic (RF, optical or nuclear regions of x-rays and gamma) and acoustical (through water, air or solid materials).

The beacon modulation in the preferred embodiment utilizes spread spectrum full carrier suppression to accomplish code division multiple access (CDMA) simultaneous reception of many beacons. The modulation from all beacons may or may not be phase coherent or time synchronized between the entire beacon constellation. The constellation signal coherence and synchronization state is an issue of the choice to be made by the particular configuration desired and matter related to cost and flexibility of the remote receiver equipment.

The preferred design philosophy is a combination of the satellite navigation architecture of three segments and the spectral compression GNSS reception methodologies. The wideband RF signal structure minimizes the spectral density and the potential for interference with other RF equipment that may be in the area as well as limiting the potential for interference to the system of this invention. This is preferably accomplished by spreading the signals over the maximum band allowed, approximately 20 MHz, by utilizing predefined ranges of ISM bands, for example, centered at 915 MHz, 2.4 GHz and 5.8 GHz in accordance with current U.S. regulations.

System and Method Overview

The preferred embodiment provides a local area positioning system and methodology that produces high accuracy positioning (centimeters if required), simplicity of operation and low-cost implementation so as to achieve a ubiquity of utilization. More specifically, the present invention blends three methodologies: radio astronomy space geodesy, spread spectrum communications and the methods of non-linear processing of signals from the GPS.

Radio astronomy, such as very long baseline interferometry (VLBI) space geodesy, utilizes the concept of an array of incoherent radio sources, typically quasars, to serve as a frame of reference to determine the three dimensional vector separations between two or more radio telescopes.

Spread spectrum CDMA communications exploits the methodology of direct sequence pseudo random noise (PRN) generation using a linear tapped shift register feedback digital generator. PRN generators use an internal frequency source to operate the clocking of the shift register operation that serves to achieve carrier signal suppression and spreads the signal to reduce the spectral density. This provides simultaneous advantages of channel reuse, relative immunity to in-band interference and low probability of detection and interception.

The methods of non-linear GPS signal utilization provide the basis for a derived methodology known as spectral compression that minimizes expense in terms of custom chip/firmware development and DC power consumption. A typical GPS receiver functions by having a priori knowledge of the PRN code sequence that each satellite used to spread the carrier signal onto which telemetry is modulated. This in turn allows the GPS receiver to extract the navigation message including the time and frequency synchronization state of each satellite in order for the GPS receiver internal processor to derive its position and velocity in an autonomous manner. By comparison, spectral compression GPS methods derive phase ranging data types from multiple synchronized satellites without any knowledge of the PRN code sequence used to spread the carrier signals.

The design of the beacon constellation avoids the need for time and frequency synchronization while still functioning as the frame of reference for physical state determination. In the simplest form, the beacons form an incoherent array of low power RF signals of very low spectral density so as to avoid interfering with other systems in the same spectral region, most likely the ISM bands. The incoherent beacon array is usable in the differential relative positioning approach of the VLBI. The beacons and location sensors depend upon crystal reference sources no better than those used in inexpensive digital wristwatches, with a frequency accuracy and stability of approximately 10 parts per million (PPM). In the spectral compression methodology there is no telemetry extraction. As a result, beacons are distinguished from one another by their designated frequency offsets relative to PRN sequence chipping rate nominal frequency.

The location sensors do not depend upon cross-correlation signal processing of known PRN code sequences to derive pseudo ranging. Spectral compression methods allow the acquisition of ambiguous phase ranging observables derived from a delay and multiply non-linear processing that recovers the chipping frequencies of each beacon.

Each of the beacons preferably makes use of the same PRN sequence. In a preferred embodiment, the PRN code is of maximal length, meaning that it has an auto-correlation function that is zero for all shift values except when shifted by zero or a value equal to the code length given by $2^n-1$, where n is the number of shift register stages.

With calibration processing of all non-repeated pairs of inter-beacon baseline vectors, the present invention combines the N beacons into the equivalent of a geodetic network adjustment of dimensions $n/2 \times (n-1)$ combinations. For example, with six beacons configured to receive or transmit in accordance with the calibration methods described in the present invention, there will be fifteen unique baseline vectors in the network. Network based calculations results in advantages related to data processing, especially when RF multipath contamination is present; for example, multipath contamination will be particular to each of the baseline vectors and not systematic throughout the network. Thus, the network adjustment produced as a result of the present invention is effective in deriving the best estimate of the true beacon physical state and provides a figure of merit as to the accuracy of the individual measurements when applied to measurements made by location sensors. These network estimates can be applied to continuously monitor the configuration data integrity, making the system self calibrating and able to monitor for unexpected changes in physical states of beacons relative to the common internal frame of reference. In the present invention, the location sensor physical state may be estimated as part of the network or after application of network adjustments as corrections pursuant to the a priori beacon Almanac information.

By way of example, various alternative embodiments of the present invention are contemplated and illustrate in part the scope and applicability of the technology.

A centralized processing unit that receives the spectral compression observables for one or more location sensors and reference points enabling physical state estimation of selected location sensors and reference points.

Placement of the beacons can be somewhat arbitrary, as they themselves can act as a location sensor, positioning themselves within the network in a post deployment calibration mode. In this embodiment, vertical in addition to horizontal placement of at least one beacon device is used to achieve 3-D positioning.

The location determination system may be underlain on existing communication bands without interference. This embodiment utilizes whatever system exists to augment its capabilities without requiring the existence of a particular communication network.

Simultaneous observation of beacon signals from a reference location sensor and from a second location sensor in which a differential signal is formed which removes common time offsets. In this embodiment, timing requirements are reduced without sacrificing overall measurement precision while simultaneously enabling a low-cost oscillator implementation. CDMA signals are separated in their PRN chipping frequency with sufficient separation for unique identification. There is no need for a frequency standard better 1 PPM accuracy such as a temperature compensated crystal oscillator (TCXO). In an alternative embodiment, meter level accuracy location determination is achievable with low-cost oscillators that are accurate to approximately 50 PPM although a proportionally larger separation between the beacon chipping frequencies will be needed.

Each beacon transmits a spread spectrum CDMA (code division multiple access) modulated signal over multiple channels, which are essentially overlapping but with each beacon having a slightly different chipping frequency for its PRN (pseudo random noise) sequence generator. The processing approach does not require beacon reference frequency coordination, phase coherence or time synchronization between multiple beacon units.

Ranging signals within a specified RF band are modulated with a very long period (on the order of 100's of days) tapped feedback shift register sequence, allowing for 100's of simultaneous beacons to operate from a given code generation. Each beacon is offset in time within the long sequence so that it only provides its portion of the sequence over an interval of 1 day. In one alternative embodiment, an approximately three second repeating PRN code sequence is used in all beacons, which has a chipping frequency of 10.23 MHz with each beacon started at an arbitrary time. This embodiment exploits the fact that there is a low probability of ever having two identical start events that coincide and remain within 50 nsec. The identity of the particular beacon, within the configured environment, is indicated by the PRN sequence chipping frequency. For example, an offset of 125 Hz above the nominal 10.23 MHz chipping frequency might correspond with the beacon placed in the northeast corner ceiling location of a large warehouse.

A location sensor within the domain of the local positioning system determined by the beacons that will despread the CDMA signals utilizing techniques of Spectral Compression, which recovers the chipping frequency of the particular beacon being received. Each beacon will use two or three PRN channels with different chipping rates (for example, 10.23 MHz, 1.023 MHz and 0.1023 MHz, corresponding to ambiguity wavelengths of approximately 29 m, 293 m and 2.93 km, respectively) so as to allow the resolution of phase ambiguities of the next highest frequency chipping frequency. Frequency offsets, chipping rates, and channels are all configurable based on the intended application, device environment, and accuracy requirements, and are fully configurable. In the preferred embodiment, the location sensor utilize FFT processing to determine the amplitude, frequency, and phase for each of the three channels from each beacon signal received. An alternative embodiment may also extract amplitude, frequency and phase using a series of phased lock loops, one for each beacon on each channel.

With a sufficiently high signal to noise ratio, a single additional 102.3 kHz channel may be sufficient to resolve the 29.3 m ambiguity from the 10.23 MHz channel. For example, with a receiver operating in a spectral compression delay and multiply mode, that achieves an amplitude signal to noise ratio of 100 to one, the phase noise will be 0.01 radians or 0.6 degrees or 1.6 milli-cycles or 5 meters. A five meter precision obtained from the 102.3 kHz chipping rate channel will reliably resolves the 29.3 meter ambiguity. The 102.3 kHz channel ambiguity will have its 2.93 km ambiguity, however, for a physical space where the separation between the user remote unit is also less than 1.4 km, there is no ambiguity. In an alternative embodiment, a third channel of perhaps 1.023 kHz with a 293 km ambiguity and phase precision of 500 meters may be used to resolve the 2.93 km ambiguities from the 102.3 kHz chipping frequency PRN generator.

The technology has application for RTLS applications in which location sensors are placed on an asset to be tracked, and further in applications such as bar code scanners in which the scanner unit itself acts as the location sensor, and correlates position to the bar code identification of a given asset.

These and other embodiments of the present invention provide some or all of the following advantages:

The capability to arbitrarily place beacons and for them to be able to determine their own locations, thus reducing the cost and complexity of installation and use of the system.

The capability to eliminate the requirement for time and frequency synchronization such as between the tags and readers in other systems. This greatly reduces the complexity and cost involved in this system's deployment. This flexibility dramatically opens up the possibilities for deployment in non-standard configured environments such as emergencies where search and rescue missions require a timely response.

Use of a distributed architecture in which computation and processing of data occurs when appropriate. In one embodiment of the present invention, this occurs at a central site with data transferred from individual units. In an alternative embodiment, this occurs within the sensing unit itself. The capability of the present invention to dynamically locate the computation algorithms allows for simple and relatively inexpensive implementation of sensors where appropriate, or more complex and expensive sensors with full positioning capability if that is appropriate for other applications.

The capability to perform a hybrid local area and wide area location determination in the same platform. That is, local positioning performed when GNSS signals are not available or, if GNSS signals are available, processing data simultaneously.

The use of a software defined radio architecture that allows the simultaneous processing of GNSS or other signals of opportunity without significant changes to hardware or software implementation.

Preferred System Architecture

In the present invention, the functional components comprising the physical state determination system for configured environments can be implemented in a variety of ways to optimize performance. FIG. 1 shows the logical functions of the present invention without consideration for a specific implementation or deployment scenario. The diagram shows the fundamental blocks and data relationships typical in a preferred implementation of the present invention.

More specifically, with reference to FIG. 1, the preferred embodiment of the present invention is described as follows. Beginning with a plurality of ranging signal transmitters (RST) 101, the system transmits multiple ranging signal transmissions 108 that are simultaneously received by one or more spectral compressor and translators (SCT) 103. The RSTs preferably transmit one or more ranging signals into a surrounding medium, typically free-space by RF signal, perhaps in the ISM bands, although other media are also possible such as by acoustic signal through water, soils, rock or structural materials. These alternative signals preferably have characteristics that can be optimally configured for a particular environment. Each SCT 103 receives signals from multiple RSTs 101 and processes the signals to produce observables 110 containing information useful for estimating the SCT's current physical state (for example, position, velocity and time). One or more of these SCTs are designated as a reference SCT 104 whose observables 111 are used for purposes of system calibration and control.

Continuing in reference to FIG. 1, the observables 110 from an SCT are passed to a navigation processor 105 together with reference observables 111 and almanac and corrections data 112 through a communications means. In the preferred embodiment of the invention, it is not necessary to physically co-locate the navigation processor and SCT functions as the data communications between blocks are relatively minimal and can be handled by one or more forms of communications, for example, Ethernet, WiFi (802.11), Zigbee (802.15.4), or any communications medium capable of data transfer. The navigation processor 105 uses the observables that may include observables 118 and 111 with the almanac data/corrections 112 to determine the physical state estimate 118, which includes at least one of position, attitude, clock, and temporal derivatives for the epoch(s) specified. Epochs may be the time specified in the observables or past or future epochs if the navigation processor uses a suitable model for propagating state variables forward or backward in time. The physical state estimate 118 may be reported to any interested party as defined by a particular implementation of the system.

The system controller 102 serves to coordinate and monitor the functions of the system. It receives observables 111 from one or more reference SCTs 111 via a communication signal. This information may include optional external time reference 116 and optional coordinate system reference data 117, which is preferably collected and passed along to functions 106 and 107 for the purposes of producing system configuration and calibration information of past, current, and future physical state and configuration. The system configuration data 115 is used by the system controller to configure and adjust the plurality of RSTs 101 via communications signal 119. Communication 119 between system controller 111 and RST 101 is optional in environments where the RST 101 ranging signal transmissions 108 are intercepted by at least one reference SCT enabling the system to determine the physical state of RST 101 by means of the reference network processor 107. The reference network processor 107 uses the collected observables and a priori information about the system configuration to compute the physical state of all RSTs 101 and reference SCTs 104 in the system relative to each other. These physical states preferably consist of estimates of position, velocity (typically zero), clock and clock terms (bias, rate, etc.) as well as RST transmission characteristics, which are combined to form the almanac and corrections data 114. The almanac and corrections data 114 for one or more epochs are stored in a database 106, which is preferably configured to provide these data upon demand. In alternative embodiments, the format of the almanac and corrections data 114 enables efficient computation of future states through one or more propagation models.

The almanac and corrections data is used both by the system controller 102 and navigation processors 105 as previously described. In the preferred embodiment of the present invention, the almanac and corrections data 114 contains both the estimated state vectors for each RST and reference SCT as well as additional coefficients for a propagation model that enables the almanac and corrections data to be used successfully in the future. The ability to propagate almanac and corrections data into the future is dependent upon the quality of the RST/reference SCT oscillators, desired precision and propagation model complexity.

Integrated Wireless Data Communications Configuration

The preferred embodiment of the present invention facilitates a reduction in manufacturing cost and complexity of units implementing the SCT function while maximizing flexibility and performance. A further advantage of the present invention is achieved through integration of system functionality with wireless data communication functions, which allows sharing of digital signal processing and RF front-end circuits. As described in greater detail below, the SCT function of the present invention significantly reduces complexity and thus cost as compared to most wireless data communication receivers. By implementing SCT functions as an extension to the communications functions, physical state determination capabilities are added with little additional cost. Further, the integration with wireless data communications occurs naturally by combining sending/receiving data functions into the system controller.

Figure 2A:
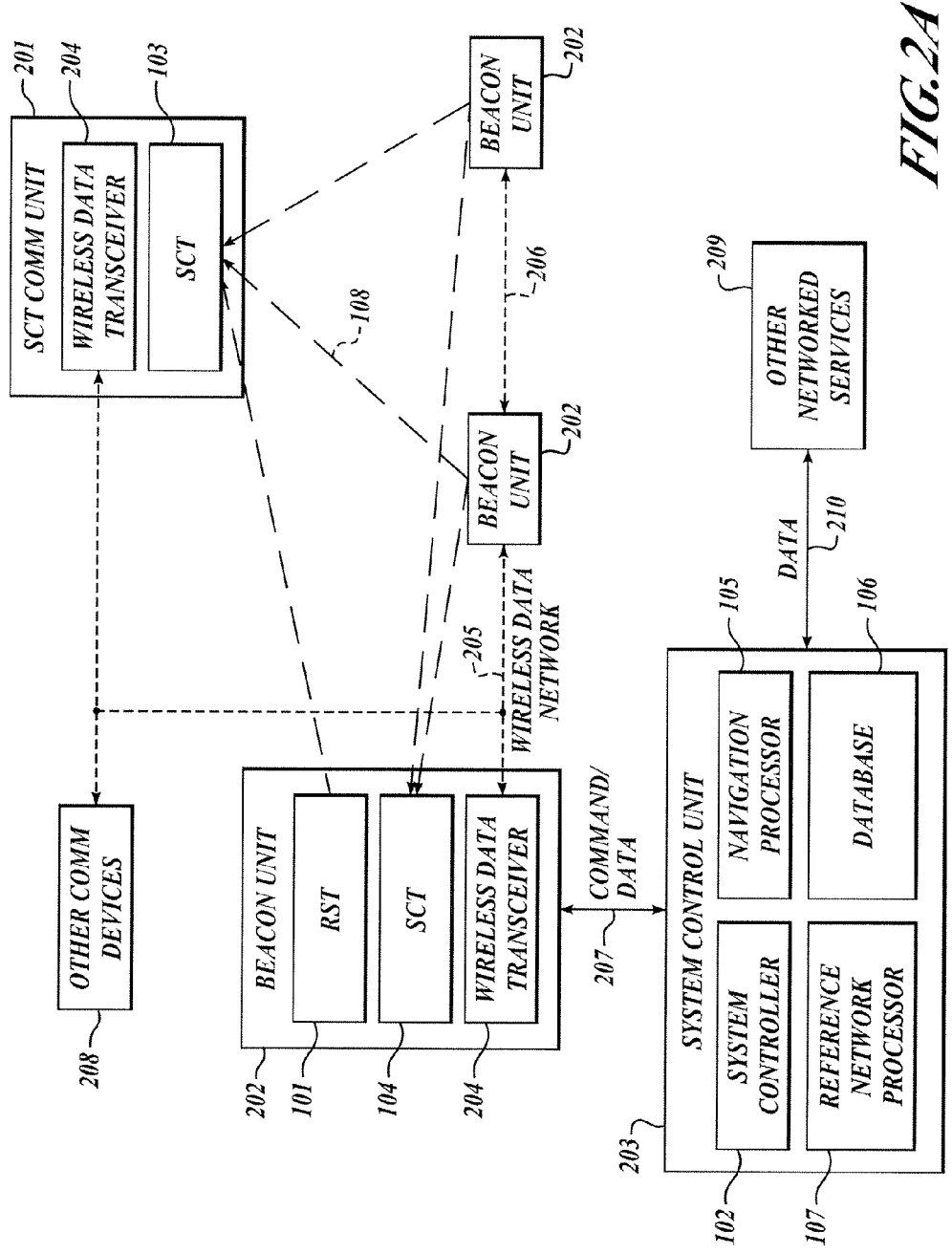
FIG. 2A shows the integration of the invention with existing communication assets in accordance with an embodiment of the present invention.

FIG. 2A shows the integration of the present invention with a meshed wireless data communications network such as Zigbee (802.15.4). An SCT 103 and wireless data transceiver 204 are combined to form an SCT communications unit 201. In its simplest form, the unit 201 represents a tag capable of RFID and physical state sensing. A beacon unit 202 is preferably comprised of an RST 101, SCT 104, and a wireless data transceiver 204. A plurality of beacon units is deployed over a physical area to provide both positioning ranging signals 108 and communications network infrastructure 205 and 206. The integration of an SCT 104 with the beacon unit enables each beacon unit to act as a reference SCT collecting observables from other beacon units deployed within range. Through this combined ranging transmission and collection of observables the system facilitates collection of the information necessary to determine its own configuration using the reference network processor 107. In one embodiment, the system controller 102, navigation processor 105, reference network processor 107 and database 106 are combined to form a system control unit 203 that centralizes the complex data processing and management functions. The system control unit 203 is preferably connected to the wireless data network 205 via one or more beacon units through a communication signal 207. For wireless data networks supporting meshed networking, beacon units 202 become nodes in wireless data networks 205 and 206. Meshed network deployment effectively simplifies installation of the location system enabling each beacon unit 202 to coordinate with the system control unit 203 via other beacons units without requiring installation of other communication mediums (e.g. Ethernet). In the preferred embodiment of the present invention, the system control unit is physically connected to one or more beacon units via an Ethernet connection, which provides advantages of robustness and reduced cost. For greater portability and flexibility, the communication signal 207 may be accomplished by connecting a wireless data transceiver 204 directly to the system control unit 203.

Once deployed, as integrated with a wireless data communications network (shown in FIG. 2A), the present invention can also be used for a variety of data networking applications between communication devices 208 and networked services 209 external to the system. As discussed in further detail below, the communication requirements for the present invention minimize the need for communications resources, leaving the bulk of the bandwidth available for other activities. In the preferred embodiment, the system control unit 203 is a gateway for networked services to access devices on the wireless data networks 205 and 206. The wireless data networks 205 and 206 may be secured by data encryption and other security means such that only authorized user is able to access and use the beacon unit 202 and system control unit 203 gateway infrastructure for relaying information between devices and services.

Figure 2B:
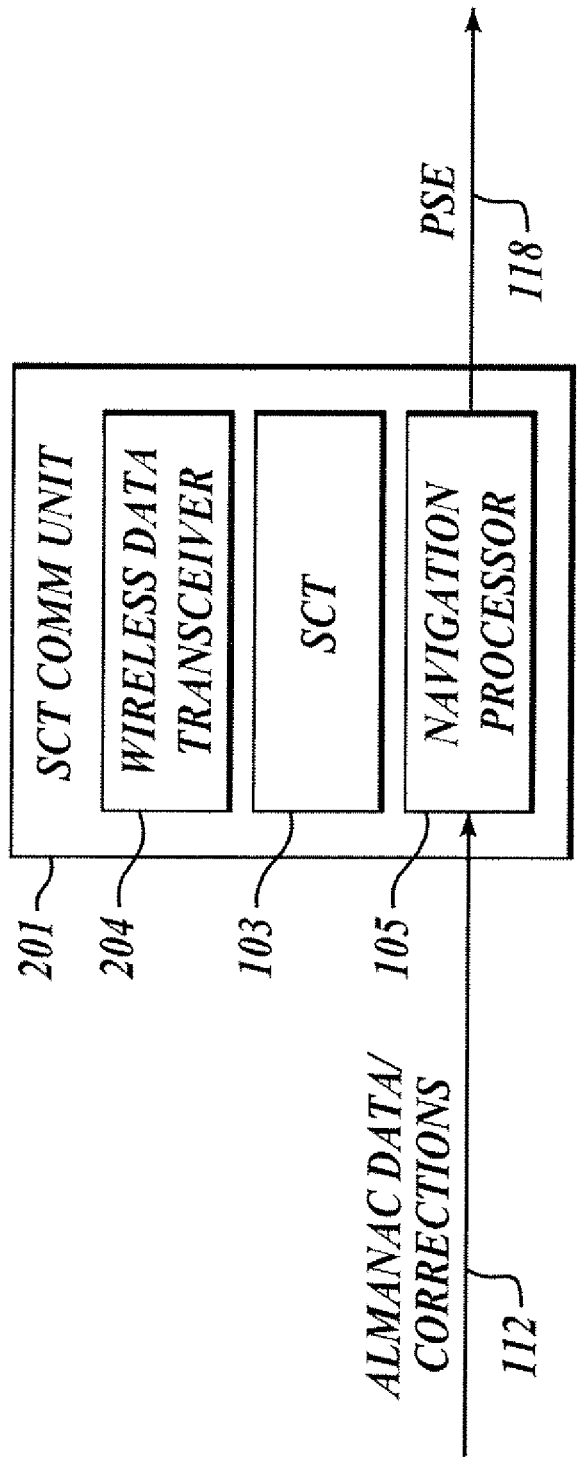
FIG. 2B illustrates the components of the spectral compressor and translator integrated with the physical state determination processor in accordance with an embodiment of the present invention.

FIG. 2B shows an alternate embodiment of the SCT communications unit 201 where the navigation processor 105 is integrated directly with the SCT 103 and wireless data transceiver 204 functions. This configuration enables calculation of SCT state vector 118 at the unit in situations where almanac and data corrections 112 are available from the system. The almanac and data corrections 112 are delivered to the SCT communications unit 201 a priori or on demand as requested by the unit 201. In an alternative embodiment, the unit 201 may request observables from one or more reference SCTs to determine a full differential solution. Similar to the configuration of FIG. 2A, the semi-autonomous configuration described in FIG. 2B may utilize system control unit determined physical state estimates as needed. For example, this capability may be useful in situations where the navigation processor 105 is unavailable due to limited power resources.

FIG. 2C shows an alternate embodiment of the SCT communications unit 201 in which a machine to machine interface (MMI) 235 is integrated with core SCT functions 103 and wireless data transceiver functions 204 to provide SCT physical state estimate (PSE) 118 and data communications 233 for external devices 234. This configuration is typical of a location-enabled communications peripheral, where the external device 234 includes custom driver software enabling it to access physical state determination and communications functions of the SCT communications unit 201. This configuration represents a low-cost implementation with respect to SCT communications unit complexity. In this embodiment, the observables 111 are processed by the system control unit 203, which returns the resultant physical state estimate 118. This information is relayed by the SCT communications unit 201 to the external device 234 via the MMI 235.

FIG. 2D shows an alternative embodiment of the SCT communications unit 201 where both a navigation processor 105 and an MMI 235 are integrated with the core SCT functions 103 and wireless data transceiver functions 204 to provide a semi-autonomous positioning capability. Similar to the embodiment shown in FIG. 2B, this embodiment is capable of determining the SCT physical state estimate (PSE) 118 in situations where the systems control unit 203 delivers appropriate almanac data and corrections 112. As with FIG. 2C, the SCT communications unit 201 provides PSE 118 and data communications 233 to an external device 234.

Figure 2F:
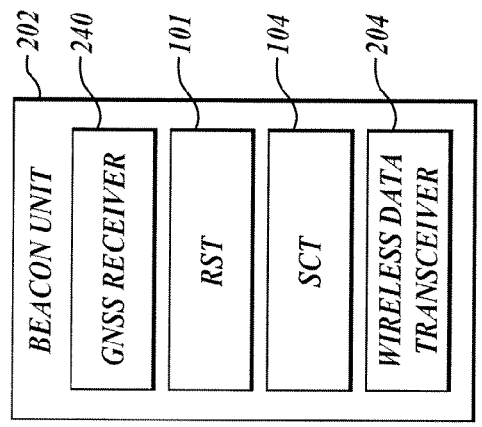
FIGS. 2E and 2F show additional block level integration scenarios of the spectral compressor and translator in accordance with an embodiment of the present invention.
Figure 2E:
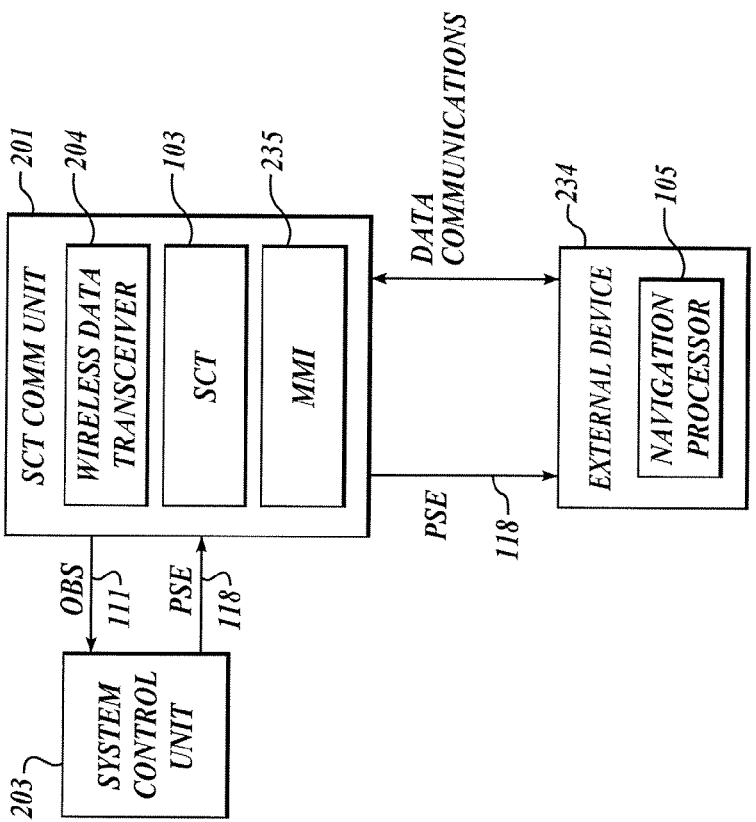

FIG. 2E shows an alternative embodiment of the SCT communications unit 201 with an external device 234 where the navigation processor 105 is hosted by the external device. In this case, the external device has sufficient processing capability to perform the navigation processing function enabling the SCT communications unit 201 to be substantially simplified, incorporating SCT functions 103, wireless data transceiver functions 204 and MMI functions 235, thus requiring less power. The system control unit 203 provides almanac and corrections data 112, and/or processing of the observables 111 to produce the PSE 118 as requested by the external device 234 in cases where the device opts to disable its own navigation processor 105 function.

FIG. 2F shows an alternative embodiment of the beacon unit 202 where a GNSS sensor capability may be provided using a separate GNSS sensor function 240. For example, a separate GPS C/A code correlating receiver may be integrated with a beacon unit, providing an immediate source of timing and geodetic positioning information about the unit, tying the local time and coordinate system to universal time coordinated (UTC) and the world geodetic system 1984 (WGS-84). The GPS integrated beacon unit has value as a WGS-84 reference point and in facilitating deployment of the present invention over larger outdoor areas, where performance can be significantly improved by using the present invention concurrently with GPS.

Integrating the present invention with a wireless data communications network, for example as illustrated in the previous series of diagrams, provides flexibility to configure more optimal implementations for specific applications. One example is the case where a beacon unit is configured without integration of an SCT or a wireless data transceiver. This simplified beacon transmits a ranging signal in accordance with configuration data loaded prior to its use. These beacons can be deployed at known points for the purposes of augmenting the positioning performance when additional communications infrastructure is not required. This simplified beacon embodiment is substantially less expensive to produce than a more fully integrated alternative.

Integrated GNSS Configuration

Figure 3:
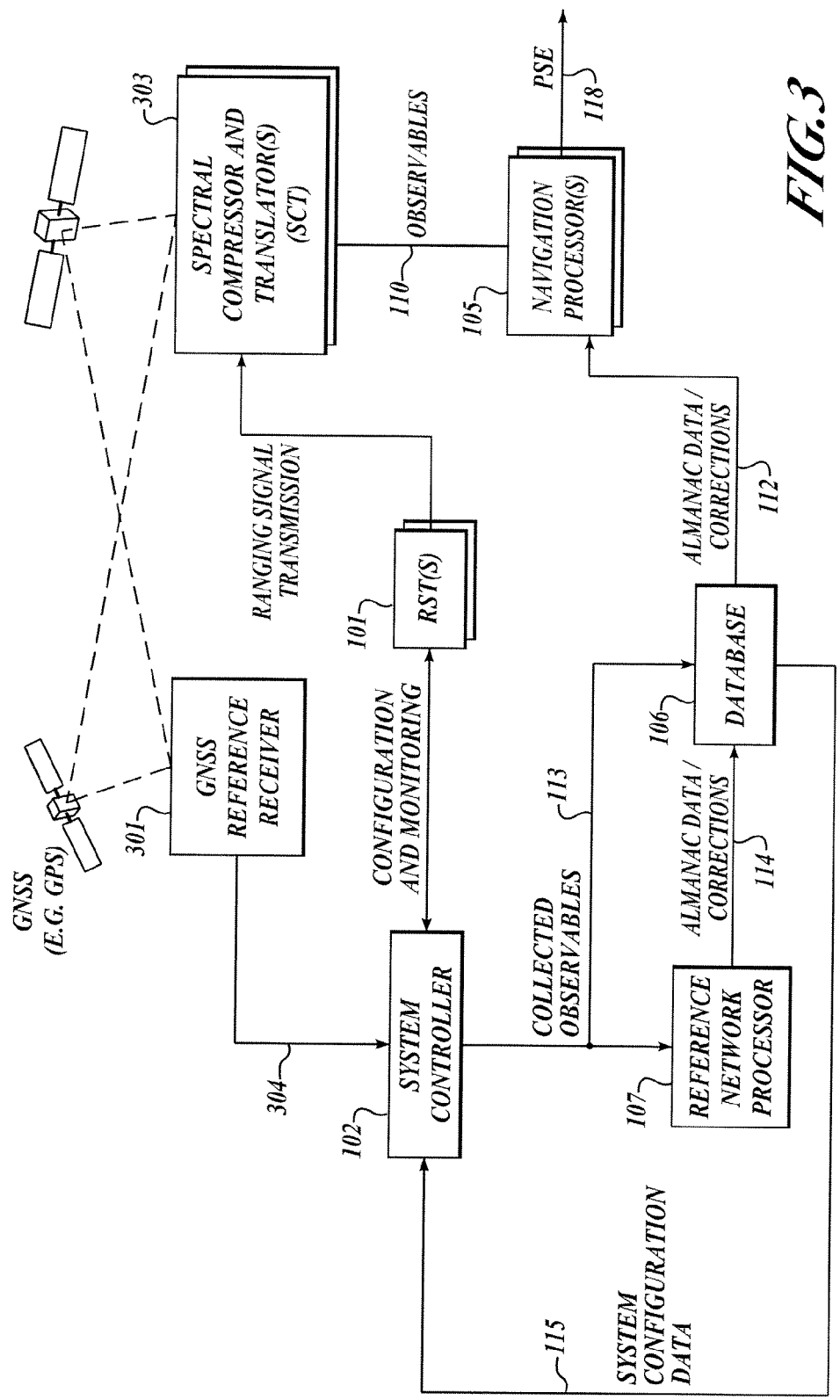
FIG. 3 shows a logical diagram for a scenario in which the invention is combined in a hybrid operation mode with GNSS signals in accordance with an embodiment of the present invention.

The present invention can be easily adapted to simultaneously support ranging signals from GNSS as well as the local signals transmitted by a plurality of RSTs. FIG. 3 shows a logical function block diagram where GNSS sensing is incorporated with the present invention. The functions of the present invention previously referenced as 102, 103, 105, 106, and 107 are extended to support reception, processing, and management of additional observables and almanac data needed to process GNSS ranging signals. In this embodiment, the SCT 103 receives both the GNSS 303 and RST 101 ranging signals simultaneously on two separate channels each configured to support the specific characteristics of the ranging signal type (either RST or GNSS such as GPS). The SCT generates observables 110 and tags the data with channel configuration data such that the information can be readily processed by the navigation processor 105. The navigation processor is preferably extended to support simultaneous processing of both RST and GNSS observable data. Observables may be processed in the local coordinate system or some earth-fixed coordinate system such as WGS-84. As with the non-GNSS supported implementation, the navigation processor produces one or more physical state estimates 118 for each of the SCT observable sets.

To support processing of GNSS observables, the system management functions including components 102, 106, and 107 in FIG. 3 are extended to manage GNSS constellation information such as satellite orbits, clock information, status, etc. The GNSS constellation and observables 301 information are collected by the GNSS reference receiver 302 or provided by some external source (not shown) and submitted through a communications signal 304 to the system controller, which formats these data for internal use and stores it in the database 106. The almanac and data correction 112 provided to the navigation processor is extended to include information about the GNSS constellation and current GNSS observable corrections in addition to the RST almanac and corrections information already provided. In cases where the GNSS receiver is part of the beacon unit discussed previously (FIG. 2E), both the GNSS observables and the beacon constellation information may be used by the reference network processor 107 to further refine the placement of the beacons and ultimately improve system precision and accuracy.

Ranging Signal Transmission

While there are a variety of ranging signal structures that can be used to implement the present invention, the preferred embodiment of the present invention focuses on selecting signals that meet the following criteria: (1) include necessary precision requirements; (2) can be easily generated; (3) can be configured to transmit in a variety of RF or acoustic regimes; (4) are resistant to multipath and noise; and (5) possess low interference characteristics compared to other RST ranging signals in the energy emission region. In the preferred embodiment, direct sequence code division multiple access (CDMA) spread spectrum is the preferred method for generating ranging signals, where the pseudo random noise (PRN) sequence is a maximal length code selected for its low cross-correlation and autocorrelation properties.

In the preferred embodiment, beacon transmissions incorporate code orthogonality so that significant inter-modulation products will not occur in the delay and multiply function of the spectral compressor. The code properties are available from the GPS gold codes but are typically limited by the 32 or 34 code sets. However, alternative code modulation approaches are possible such as how the GPS design of the P(Y) channel is structured using a very long code sequence of 267 days, which has a 10.23 MHz chipping rate. In the P(Y) channel example, seven-day segments of this very long code are assigned to each satellite of the constellation with the entire satellite constellation resetting the phase of the code sequence to its starting condition at midnight each Saturday. This P(Y) code has the properties of code orthogonality such that the auto-correlation of the code is zero everywhere except when the code shift is zero or by multiples of 267 days. In the present invention, any long code with minimal autocorrelation, including the P(Y) code generation, can be configured, after which segments are assigned to each of the beacons.

Many beacons can be operated at random start times and the cross correlation between these beacons is essentially zero. For example, a 25 stage tapped shift register feedback pseudo random noise (PRN) sequence generator will have a code length of approximately 34 million chips code length. Assuming a chipping rate of 10.23 MHz, it will take 3.3 seconds to repeat this code.

Figure 4A:
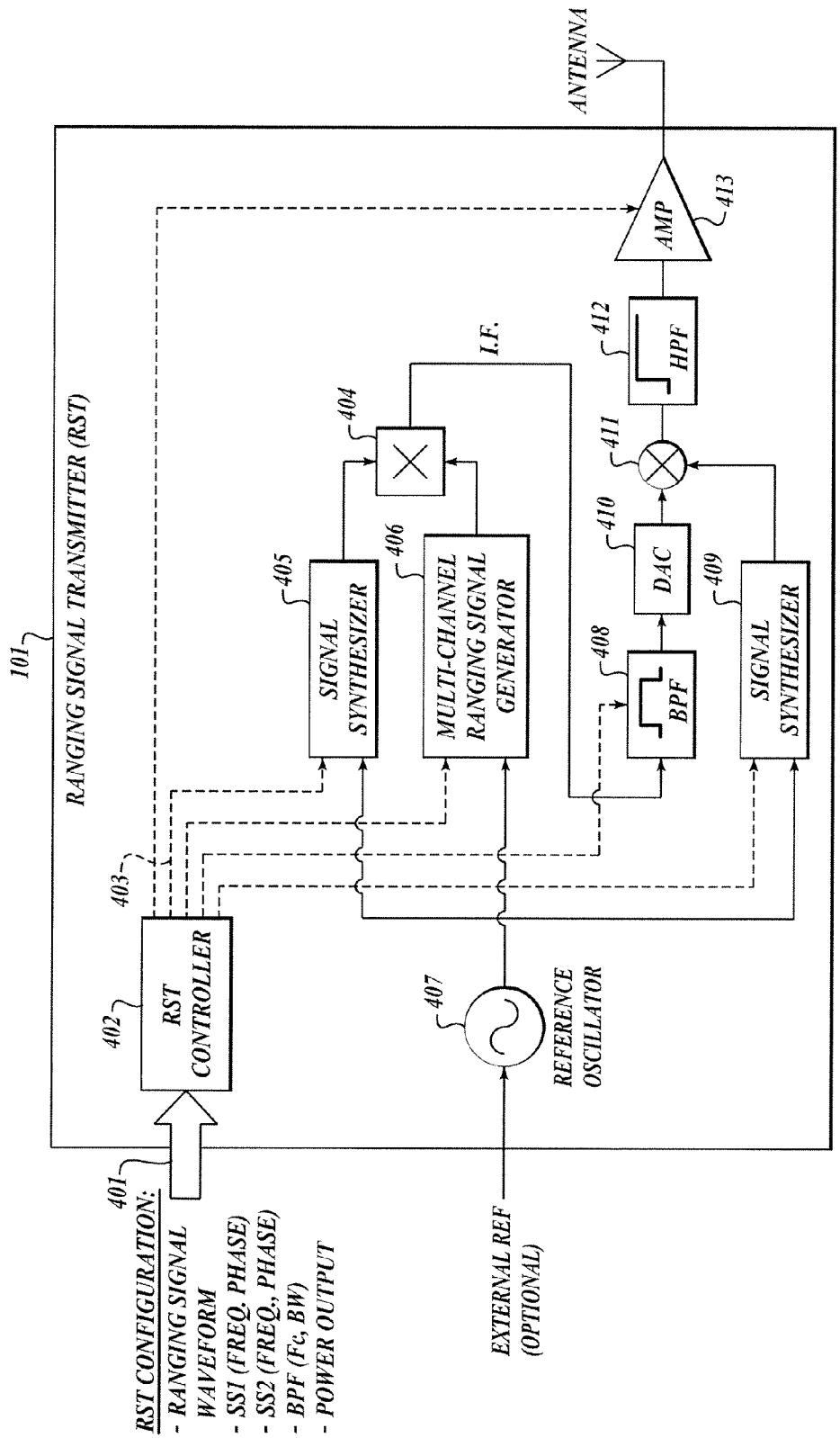
FIG. 4A illustrates the detail of the ranging signal transmitter in accordance with an embodiment of the present invention.

FIG. 4A shows a logical function block diagram of the ranging signal transmitter (RST) 101, which embodies the signal generation functions described above. The RST uses a multi-channel ranging signal generator 406 to generate the specific ranging signal in accordance with the desired characteristics. This signal is then used to modulate 404 an intermediate frequency generated by a signal synthesizer 405. Depending upon the configuration, the resultant signal is filtered by 408 (either allowing the upper band, lower band, or both to pass) and passed through to a digital to analog converter 410. The resultant analog signal is up-converted 411 to the R.F. band using the frequency generated by signal synthesizer 409. The up-converted R.F. signal is passed through a high pass filter 412, amplified 413, and transmitted. The RST controller manages the particular configuration 403 of the RST module. Each of the module functions is preferably programmable, which provides the advantage of enhanced flexibility. An RST may be programmed to transmit a variety of different ranging signal structures at various RF frequencies. This logical structure for the ranging signal transmitter has many possible variants depending upon the particular implementation design and desired optimizations. The preferred embodiment for the RST is to balance cost, precision and flexibility.

Figure 4B:
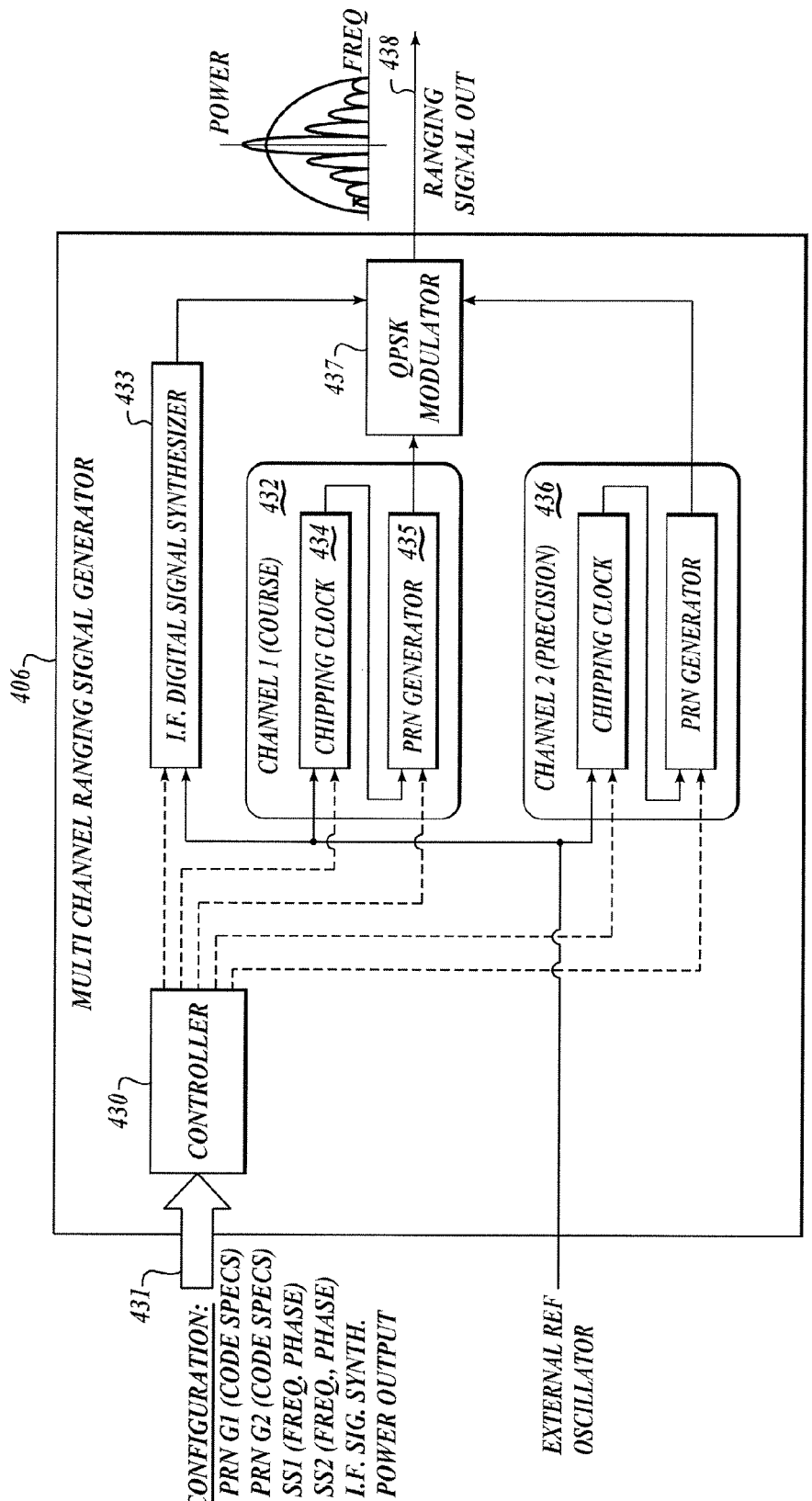
FIG. 4B illustrates the generation of the ranging signal within the RST in accordance with an embodiment of the present invention.

FIG. 4B shows the logical function blocks for a multi-channel ranging signal generator 406. In this embodiment of the present invention, the generator has two programmable channels 432 and 436 that drive a digital quadrature phase shift keying (QPSK) modulator modulating the I.F. signal generated by the digital signal synthesizer 433. The output of the modulator is the digital spread spectrum ranging signal 438 centered at the I.F. frequency. Each channel (432 and 436) preferably contains a digital chipping clock 434 that is programmable in frequency and phase that drives the PRN sequence generator 435. The PRN sequence generator can be programmed for variety of different maximal length code sequences and offsets within the sequence. The first channel 432 is preferably chosen as the coarse channel and the second channel 436 as the precision channel. Channels 433, 434 and 436 are tied to a common external oscillator reference to ensure phase coherence. The controller 430 manages the generator configuration and provides a simplified interface 431 for configuring the function.

Ranging Signal Processing

Figure 5A:
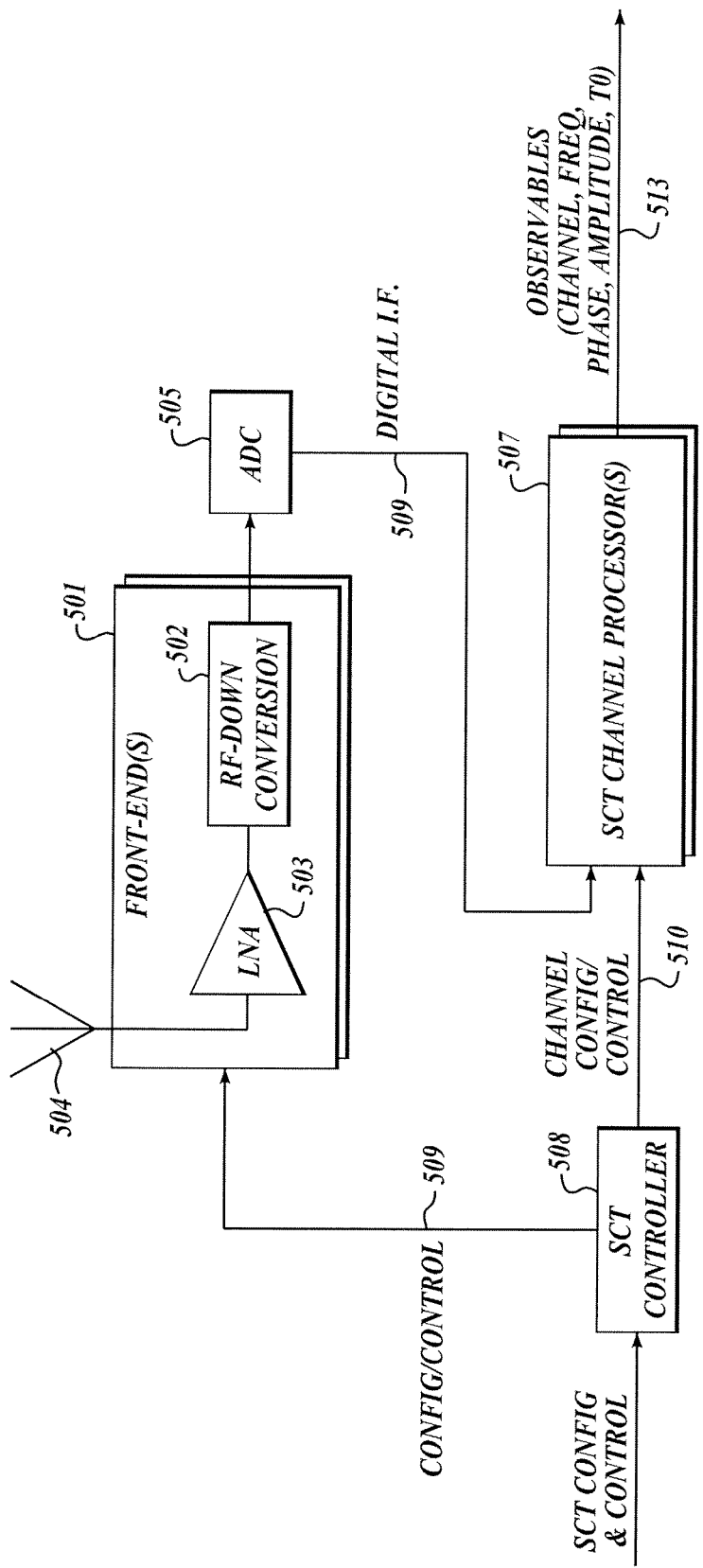
FIG. 5A illustrates the functionality of a spectral compressor and translator in accordance with an embodiment of the present invention.
Figure 5B:
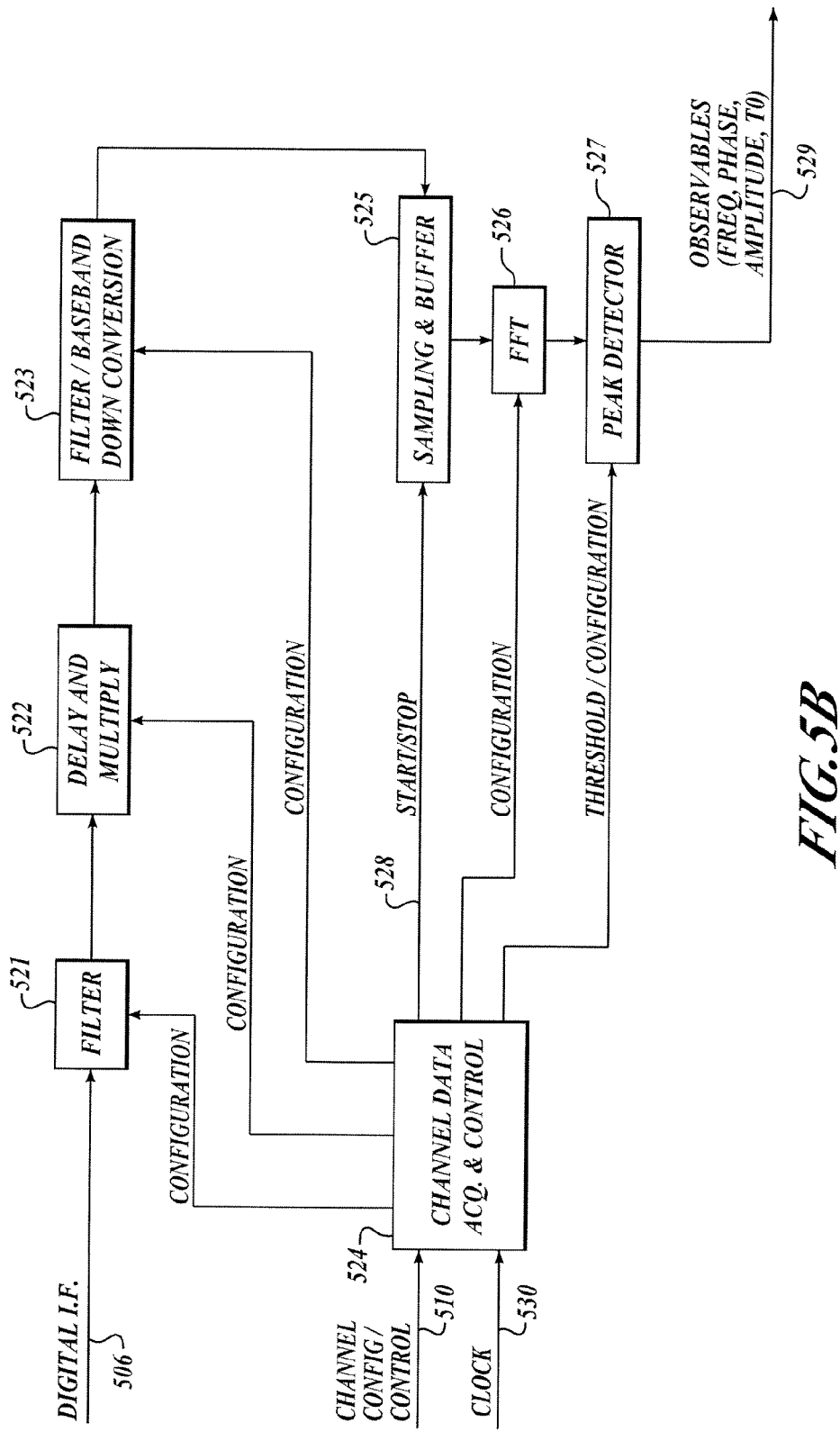
FIG. 5B illustrates the functionality of the channel processor component of the SCT in accordance with an embodiment of the present invention.

FIGS. 5A and 5B illustrate internal functions of the SCT 103 described previously and is the preferred embodiment for processing ranging signals into the observables needed to determine physical state. In this embodiment of the present invention, the SCT processes direct sequence spread spectrum ranging signals such as the RST 101 ranging signals and ranging signals transmitted by GNSS satellites (e.g. GPS C/A and P(Y) L1/L2 transmissions) simultaneously. The method shown in the illustrated example utilizes spectral compression techniques that allow suitably constructed ranging signals to be compressed into observables (e.g., amplitude, frequency, phase and time reference) without requiring complex cross-correlation signal processing methods that are common in typical spread-spectrum communication systems. With a single channel, the spectral compression method allows for simultaneous compression of all ranging signals with common characteristics into a set of observables. The SCT can preferably implement multiple channels enabling compression of multiple types of ranging signals in the same or different bands simultaneously. Through this mechanism, the function is capable of receiving and processing both RST and GNSS ranging signals simultaneously without loss of continuity as an SCT transitions from one environment to another.

Though spectral compression is the preferred embodiment for processing intercepted emissions, alternative embodiment of the present invention can use similar methods of cross correlation, such as GPS, to produce code-phase observables for beacons and GNSS satellites. Using the types of sensors necessary to produce such code-phase observables would be more complicated and expensive to implement; however, in certain applications, such alternative methodology may be desirable if, for example, needs require that the sensor be able to decode information embedded within the ranging signal transmission.

In FIG. 5A, suitably constructed ranging signals or any suitable energy emission are intercepted by the spectral compressor translator (SCT) at an RF antenna 504 that is connected to the SCT front-end 501 that is composed of a low noise amplifier (LNA) 503 and an RF-down conversion stage 502. As needed, multiple front-end(s) 501 may be implemented to support multiple bands. For example, an SCT may be configured to support one RST/ISM band centered at 915 MHz and the GPS L1 band centered at 1575.42 MHz or the L2 band centered at 1227.6 MHz. The output of front-end(s) 501 is an analog signal that is input to an analog to digital (ADC) stage 505 that provides a digital intermediate frequency (I.F.) output. As discussed in greater detail below, it is preferred that the ADC have sufficient dynamic range to accommodate multiple beacons of widely different signal levels. The digitized I.F. signal 506 is passed to one or more SCT channel processors 507, which produce observables 513 for physical state (e.g., navigation) processing. Both the RF front-end(s) 501 and SCT channel processor(s) 507 are controlled and synchronized by the SCT controller 508. This SCT controller communicates via control messages 509 to the RF controller 501, and to the SCT channel processor(s) 507 via channel configuration messages 510. Multiple SCT channel processors may be used to fully capture all available positioning observables provided by the ranging signals. For example, an SCT configured to operate in both the ISM band and GPS L1 may operate five SCT channel processors assigned to one of the following ranging channels: ISM RST coarse channel, ISM RST precision channel, GPS L1 C/A channel, GPS L1 P(Y) channel and GPS L2 P(Y) channel. Each of these channels produces observables if the assigned ranging signal is present.

FIG. 5B describes the preferred functionality of the SCT channel processor 507. The SCT channel processor is controlled by the channel data acquisition and control function 524, which receives clock information 530. The digital IF signal 506 is first processed thru an anti-alias filter 521 to remove spurious or out of band signals. The filtered signal output from 521 is sent thru a delay and multiply process 522. The delay and multiply 522 splits the filtered digital IF signal 506 into two components, one which is in-phase and the other delayed by an interval equivalent to one-half of the beacon's spread spectrum modulation chipping rate (for example, 49 nsec for the precision 10.23 MHz channel and 5 microseconds for the 0.1 MHz coarse channel). The delayed signal is mixed (multiplied) with the in-phase version 521 signal, which recovers the chipping frequencies of all the beacons 101. These recovered signals are passed thru a filter/baseband down-converter 523 where they are temporarily held in a buffer 525. The buffered data are processed with a fast Fourier transform 526, and peaks corresponding to the identified beacon signals are identified via a peak detector 527. The observables from each beacon signal 529 consists of an amplitude, frequency and phase as well as time of observation.

Spectral compression of GPS signals operate because each satellite broadcasts a unique PRN code so that cross correlation product of each PRN sequence is essentially zero. Because the Earth is rotating and the satellites are in twelve hour period orbits, there is a Doppler shift along the line of sight of the receiver. From a crude knowledge of time and the GPS orbits it is possible to predict what Doppler shift is associated with each individual satellite. Codeless operation, for example as taught in U.S. Pat. No. 4,797,677, allows for the recovery of the chipping frequency of each of the satellites by means of a delay and multiply operation on the wideband signal from all the satellites. Using a fast Fourier transform (FFT) processing, each resulting spectral line is then associated with a specific satellite.

The present invention provides a signal detection method that is available compared to a pre-detection wideband signal capture buffer and transfer for cross correlation detection that is the VLBI approach or a pre-detection cross correlation processing of typical spread spectrum systems. The digital properties of PRN sequences are those having no auto-correlation matches except when the codes are nearly matched (within one half a chip time). For example, if the chipping rate is 10.23 MHz, the codes are necessarily aligned within 49 nanoseconds to create an interference situation. The same PRN sequences may be transmitted by all the beacons provided that they do not share the same PRN sequence starting epoch and chipping frequency. Neither of these conditions will likely be achieved with arbitrary starting conditions and low cost free running reference oscillators.

Accordingly, in a delay and multiply detection approach as taught by the present invention each of the spread spectrum beacons are preferably de-spread into a spectral line at the beacon chipping frequency. To avoid collapse of the chipping frequency spectral lines into the same frequency (e.g., 10.23 MHz), each beacon contains its own frequency offset value either above or below the nominal 10.23 MHz value. The offset magnitude is governed by the precision of the frequency reference available in the beacons. For example, using a reference oscillator with an accuracy of 2 PPM, the frequency is expected to be within +/−20 Hz at 10.23 MHz. Given that adjacent beacon channels can be in error by a similar amount with perhaps an opposite sign so an additional guard band is required for each beacon. For example, a channel spacing of 50 Hz could be considered adequate separation given that adjacent beacon channels could move in opposite algebraic senses and then the beacons would be separated by only 10 Hz. The frequency offset pattern is set by the value (50 Hz×N) where N is odd.

In an alternative embodiment of the present invention for high accuracy and robustness, a traditional cross-correlation signal processing scheme can be used in conjunction with the spectral compression methods described herein. In this embodiment, spectral compression provides the means to derive physical state information needed to enable rapid correlation lock of the correlation channels without searching. Given the use of very long code sequences and re-use of the same sequences offset in time, the spectral compression method described in this invention minimizes the need to implement complicated searching techniques. By introducing a cross-correlation capability, particularly on the precision channel, the present invention takes advantage of improved signal to noise ratio and access to carrier phase and frequency data, which in certain applications (e.g. precision aircraft landing systems) may be desirable capabilities. However, with the introduction of correlation tracking capabilities, the costs of the receiver sensor are increased significantly and may limit its use when compared to an implementation using only spectral compression.

Navigation Data Processing

The avoidance of high precision time and frequency systems to achieve phase coherence of the receiving elements is achieved with the present invention preferably by causing all SCTs to observe all beacons during the same relative interval. In this embodiment, the FFT time series yields one spectral line for each beacon signal received.

By differencing observables from a known reference SCT, the specific phase and frequency offsets of all the beacons are common-mode cancelled in this single differenced data processing in favor of a single offset of phase and phase rate (frequency offset) of the SCT relative to the reference SCT. In one example, with four or more beacons well distributed geometrically around the reference and remote SCTs, it is possible to determine the physical state relative to the reference SCT physical state.

In an alternate embodiment, equivalent results to those obtained in the above-described approaches may be achieved by forming almanac and correction information at the central reference site by means of the reference network processor or by physical state estimation of each beacon relative to at least one reference SCT, and then applying the previously computed almanac and correction information during physical state estimation given observables from an SCT. This approach is preferred when the time of applicability for the almanac and corrections data is greater than the difference between the time of almanac and the epoch for which the observables of a second SCT are collected. The time of applicability is a function of the stability of the RST and reference SCT oscillators, system configuration and the required system performance. With the distributed architecture approach, the physical state estimation by a navigation processor may take place within the SCT, an RST beacon or at any other convenient location, such as in the control processor.

Figure 6:
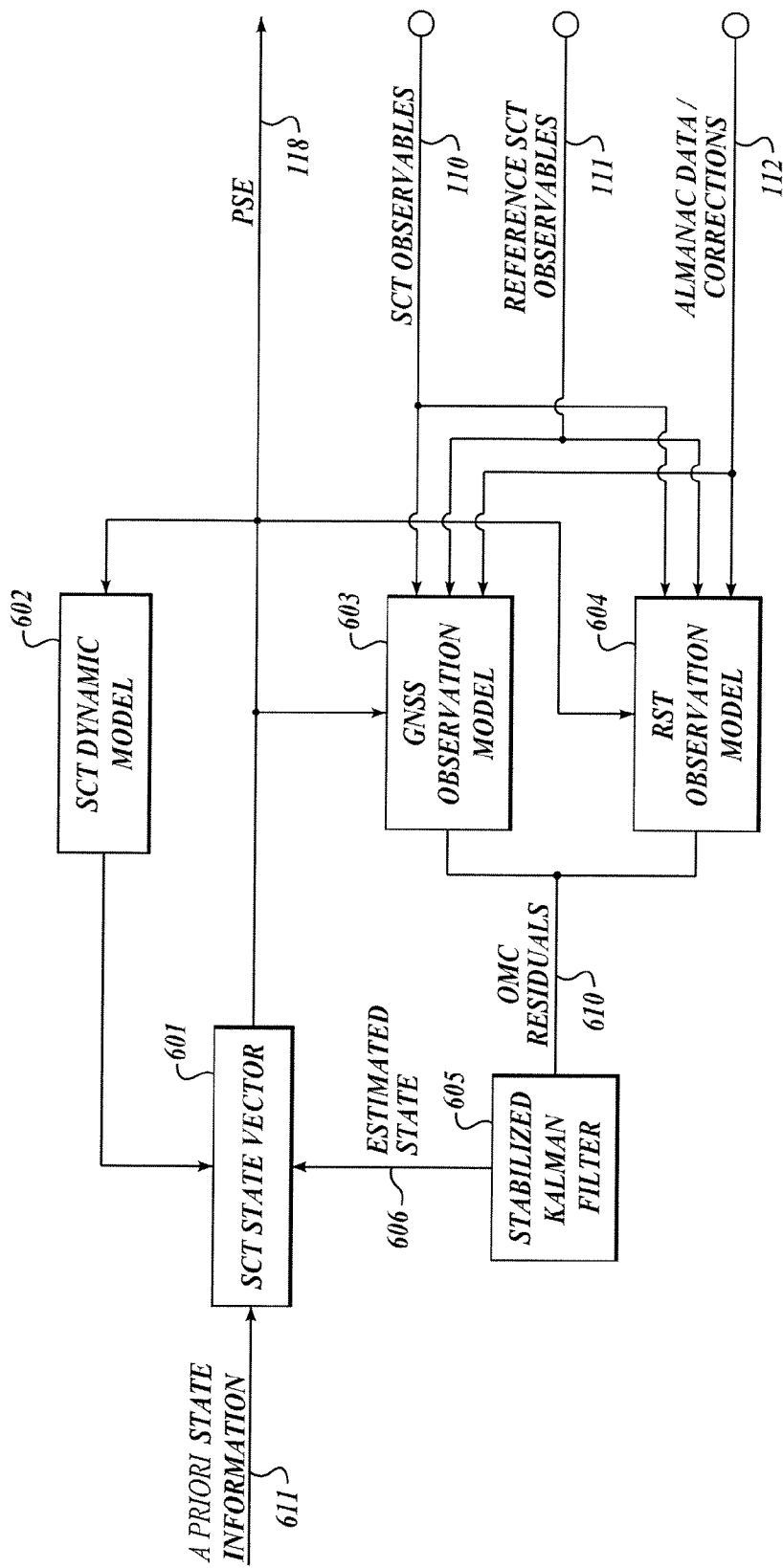
FIG. 6 illustrates a physical state estimator, which converts observed data to physical state elements in accordance with an embodiment of the present invention.

FIG. 6 illustrates an embodiment of the navigation processor, which processes the observables produced by the SCT and produces physical state estimates. The method of this embodiment includes a control feedback loop in which solutions from one epoch feed the next. A priori state information 611 is used to initialize the SCT state vector 601, providing the best estimate of the physical state parameters for the SCT. The SCT state vector 601 is preferably also initialized by the SCT dynamic model 602, which contains information about time varying state parameters such as time and frequency bias rate, and by the output estimated state 606 from the previous epoch as calculated by the stabilized Kalman filter 605. The updated state vector 601 is reported as the physical state estimate 118, which is in turn used to initialize the SCT dynamic model 602 and the RST observation model 604. The RST observation model 604 creates the state transition terms required for the Kalman filter, and also creates the residuals 610 or difference between observed and calculated values that are filtered in the Kalman filter 605. The RST observation model 604 controls whether data is processed in a differential sense with SCT observables 110 being differenced with a reference SCT observable 111, or if SCT observables 110 are corrected by combining them with the correction factors 112 determined by a reference network. If GNSS data are available because the SCT has an unobstructed sky view, the processing proceeds in a hybrid approach in the Kalman filter 605 with residuals 610 being calculated in the equivalent GNSS observation model 603. In these examples, the SCT observables 110 contain both RST data and GNSS satellite data, and the SCT observables are used in the GNSS observation model 603.

Reference Network

FIG. 7 illustrates an embodiment of the reference network that produces update reference point (e.g. beacons or GNSS satellites) almanacs and correction data for use by the system in subsequent physical state estimation for other SCTs. The inputs to the reference network process are a priori system configuration information 705, which is the best notion of the state of the system. Actual SCT observables 113, and almanac data 112, are used to propagate the physical state elements. These are all preferably used to initialize a zone processing filter 700, which determines the physical state including position of beacons and generate almanac and data correction 114 data for the entire network of beacons within the given zone.

As required to optimize efficient calibration and management of the system, zones may be defined so that a group several RSTs and reference SCTs are located within proximity of each other. Zone based configuration and management enhances configuration flexibility and reduces processing overhead in reference network processing. Within the zone processing filter 700, a single navigation processor 105 or multiple navigation processors produce physical state estimate updates for all SCTs. Multiple processors may be combined in a federated filtering sense, in which multiple navigation processors 105 concurrently process data sets that have intersecting data sets. These multiple estimates are combined by a filter combiner 702, which creates the composite estimate. The filter combiner 702 itself may be a Kalman or other state estimation filter, or may be based on a statistical combining process. The reference network processor may also be responsible for calibrating the network, essentially by determining the physical state for all reference points, and reporting these in the updated state 706. Calibration correction terms are preferably formatted and stored in a database by the almanac corrections formatter 703 and are available for use elsewhere in the system.

In one embodiment of the present invention, calibration of zones can be accomplished by selectively changing the operating mode of the RST beacon. Primarily the RST beacon transmits the ranging signal; however, from time to time, it may terminate its transmission so that it can receive signals using the integrated reference SCT. When operating as a receiver, the RST beacon listens for other transmitting beacons in the zone. Within each zone, multiple beacons may periodically listen to other beacons within the constellation so as to generate additional observables that add strength to the estimates produced by the reference network filter. The reference network filter processes these data in order to update the current almanac state configuration for each beacon. Several methods for managing the beacon operating mode (either transmit or receive) are possible and should balance calibration accuracy with overall system performance. In the preferred embodiment, enough beacons would be deployed such that it is possible to simultaneously calibrate and operate the system without adversely affecting performance, or required accuracy. A sustained period of initial calibration may be required when deploying the system for the first time and adding new zones. In these cases, a calibration pattern may be used where multiple RST beacons are cycled from transmit to receive modes such that multiple independent measurements can be made such that systematic errors are reduced. Once calibrated, the system is monitored and continually calibrated using an on-the-fly technique to update oscillator state coefficients and confirm placement of the beacons. Monitoring also provides useful data to determine the overall health and accuracy of the system.

Physical State Processing Methods

Figure 8B:
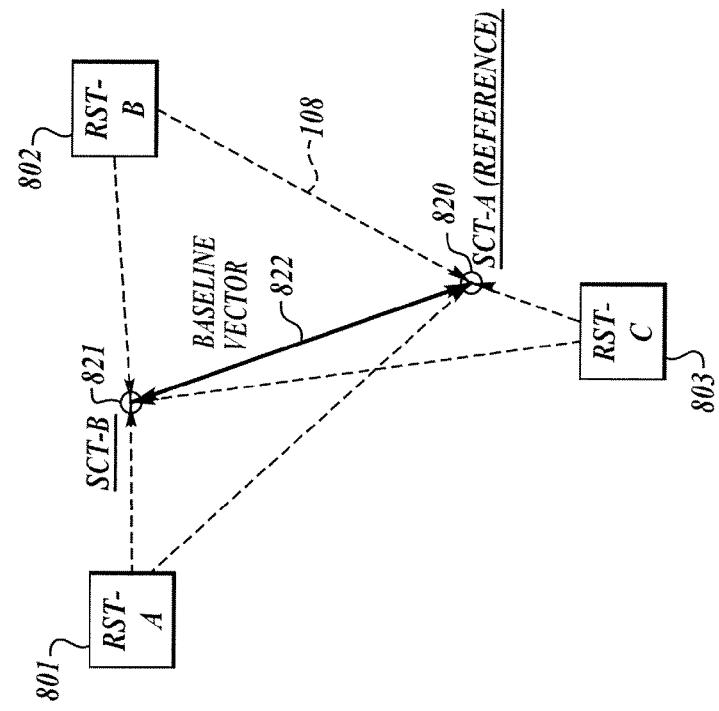
FIGS. 8A and 8B illustrate the difference between differential relative and absolute positioning in accordance with an embodiment of the present invention.
Figure 8A:
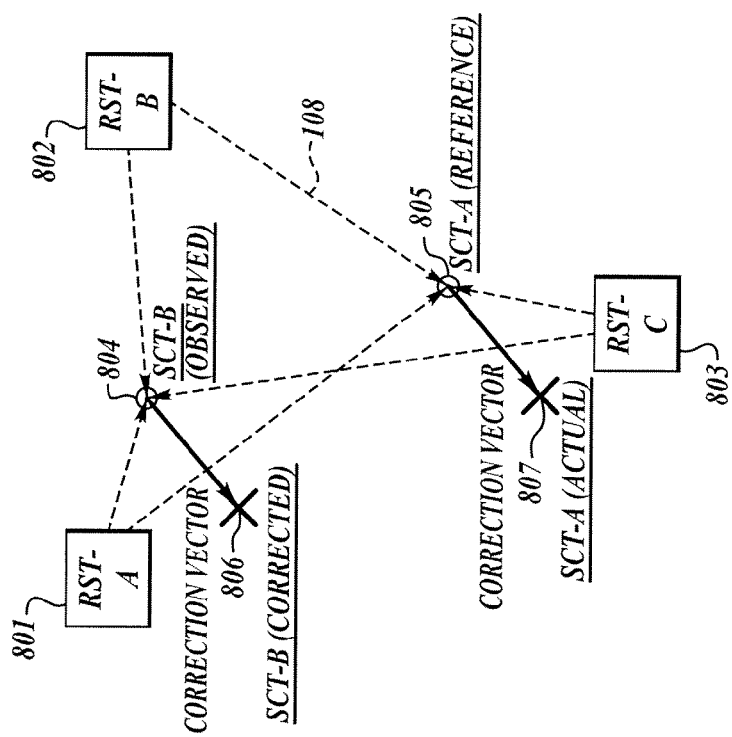

FIG. 8 illustrates two methods of determining the physical state for an SCT given an a priori set of almanac and corrections information and observables from a reference SCT. In FIG. 8A, observables from a reference SCT 805 are used to calculate real-time correction 807 that when applied to correct the estimated physical state to be the actual state as defined by the almanac for the reference SCT 805. The correction vector is used to calculate a physical state correction for each RST 801, 802, 803, which is then used to correct the physical state estimation process for SCT-B 804. An alternative but equivalent form using differential estimation is shown in FIG. 8B. The observables produced by reference SCT 820 are differenced with the observables produced by SCT-B 821, which is used to calculate the relative physical state 822. Adding the relative physical state to the reference physical state for SCT 820 produces the physical state for SCTB 821.

For systems where unmodeled error is negligible, these two methods are essentially equivalent; however, the differential method in FIG. 8B will tend to be more precise when unmodeled error is significant due to the common mode rejection of error contributions for each RST. The autonomous method of FIG. 8A may be less accurate but has the advantage of better scalability since observables for the reference SCT's need not be processed by each physical state estimation. Rather, they can be calculated once and formatted into corrections that are easily applied to subsequent processing as long as they are applied within the time of applicability.

Deployment Configurations

Figure 9:
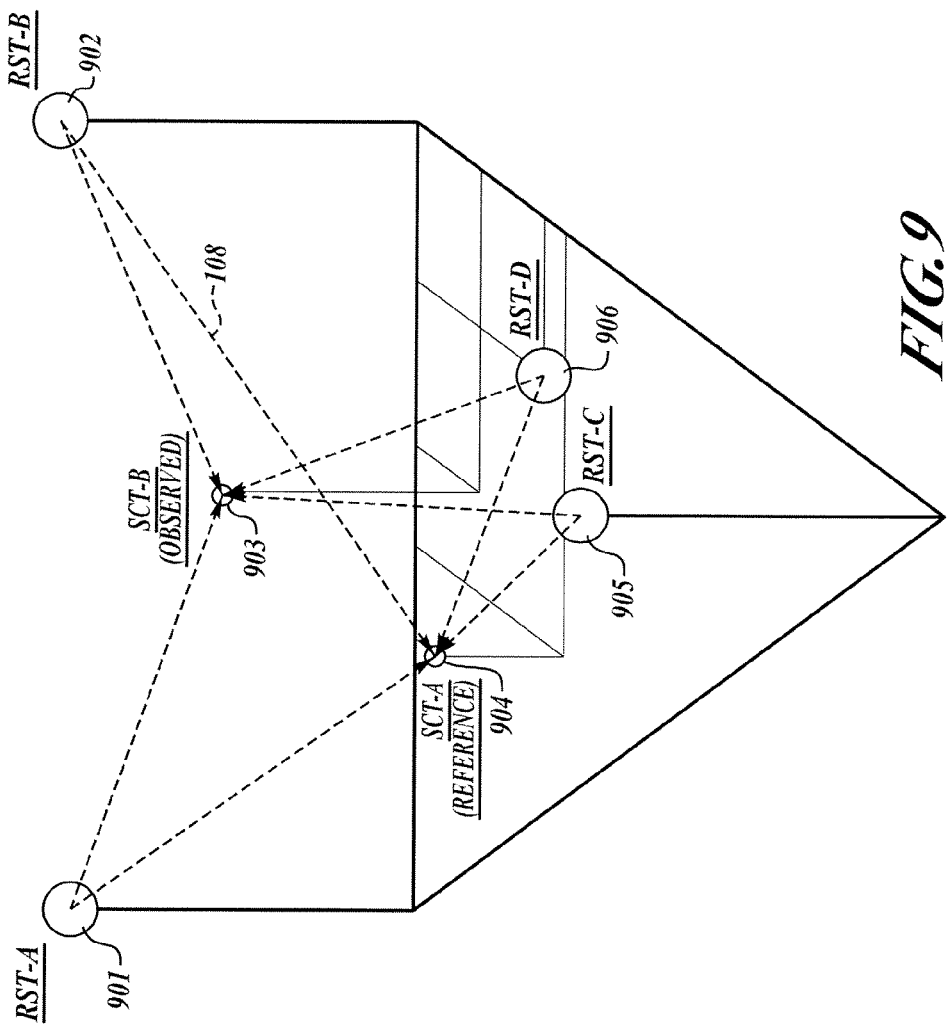
FIG. 9 illustrates a 3D positioning deployment scenario in accordance with an embodiment of the present invention.

FIG. 9 shows an illustrative example of three-dimensional positioning in which SCT units are located by intercepting emissions from RSTs placed in a non-coplanar configuration. In this embodiment, a reference SCT 904 intercepts emissions from RSTs 901, 902 and 905, which are in the same horizontal plane. Additionally, emissions are intercepted by SCT 904 from RST 906, which is located in a plane below the reference SCT 904. Additionally, a second SCT 903 intercepts emissions from the four RSTs 901, 902, 905 and 906. The fact that the beacons are not necessarily in the same plane as the SCT sensors allows for vertical and horizontal positioning of the SCT units 903 and 904, resulting in a three dimensional position given the preferred geometry.

Figure 10:
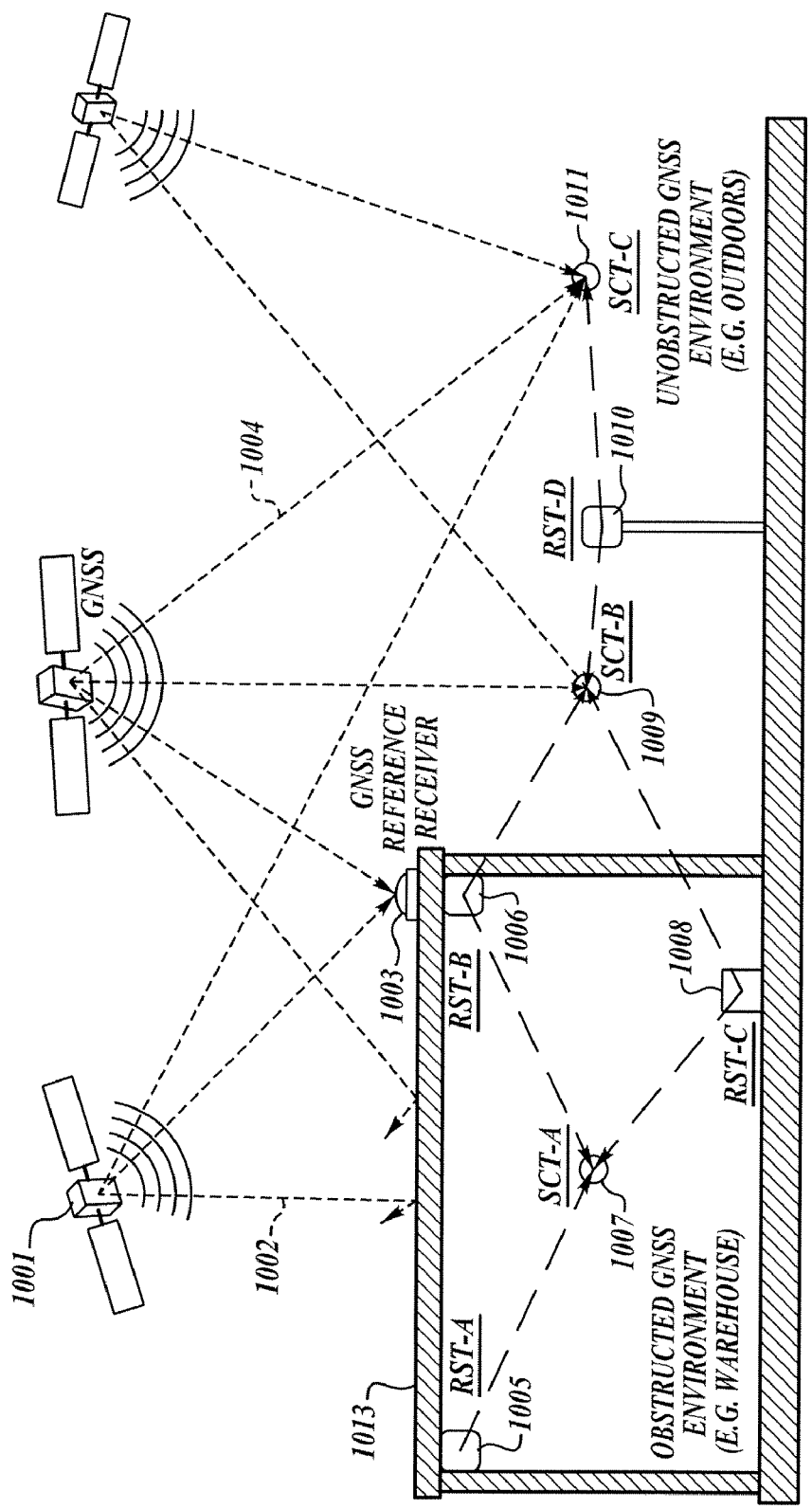
FIG. 10 illustrates a deployment scenario in which both RST and GNSS signals are available for hybrid positioning in accordance with an embodiment of the present invention.

FIG. 10 illustrates one possible deployment scenario of the present invention using both locally deployed RSTs together with GNSS satellites to provide physical state estimation in both GNSS obstructed and unobstructed cases comprising three operating environments: an obstructed GNSS environment, a semi-obstructed GNSS environment and an unobstructed GNSS environment with fringe coverage. FIG. 10 illustrates the seamless transition from an outdoor wide-area solution using GNSS to a total local-area system where GNSS satellite signals are totally obstructed. Though simplified to a 2-D illustration for purposes of the present disclosure, this illustration of the implementation of an embodiment of the present invention is equally applicable to a 3-D deployment. The physical state contains two position state parameters: horizontal displacement and vertical displacement.

SCT-A 1007 operates in the obstructed environment deriving physical state estimates using intercepted emissions from RSTs 1005, 1006 and 1008 in the manner previously described herein. GNSS satellite signal 1002 are either absorbed or reflected by the structure 1013 such that the signal level at SCT 1007 is too weak to provide useful observables. A GNSS reference receiver 1003 is deployed on structure 1013 for the purposes of collecting constellation and observable corrections that are stored in the database (not shown) for subsequent use by navigation processors (not shown).

The next situation in FIG. 10 is the semi-obstructed GNSS environment where SCT 1009 receives signals from GNSS and RSTs. In this example, not enough satellites are visible (only two) to derive physical state estimates; satellite 1001 ranging signals are blocked from view by the structure 1013. Using the present invention, SCT 1009 intercepts emissions from RSTs 1006, 1008 and 1010 for positioning and with the addition of the two visible GNSS satellites. This significantly improves the accuracy and precision of the physical state estimation. The satellite constellation information collected by the GNSS reference receiver 1003 provides satellite orbit information used to estimate the physical state using GNSS observables. Accordingly, this embodiment of the present invention provides advantages associated with augmentation of GNSS coverage in semi-obstructed environments.

The unobstructed GNSS environment in FIG. 10 is represented by SCT 1011. In this example, GNSS provides adequate coverage (represented here by three satellites, although additional satellites may be present) to estimate the physical state. Only a single RST 1010 is visible, which is not enough to produce a useable physical state estimate by itself. The SCT 1011 collects observable data from the GNSS and RST and utilizes a wireless network (not shown) to process the observables into a physical state estimate.

Alternative Applications of the Present Invention

In this section, specific applications of the system are presented to illustrate some of the many anticipated uses of the technology. These applications are all possible with the preferred embodiment of the present invention; they are illustrative only of alternatives readily taught by the present invention, and are not meant to define an exclusive set of possible applications.

Integrated Bar Code Scanning Application

An alternative embodiment of the present invention provides for integration of an SCT communications unit with a barcode scanner. When a barcode associated with an object is scanned, the time and position is maintained as a record of the last known place and time the object was observed. For inventory and warehouse logistics, this application of the present invention enables 3-D indoor tracking of items without the expense of actually tagging the object with its own SCT communications unit. Position tagged barcode scans offer an alternative approach to implementing a full RFID tracking and positioning system where the size and/or cost of the tracked asset does not justify the additional expense.

Integrated Passive RFID Tag Reader Application

An alternative embodiment of the present invention provides for integration of an SCT with a passive RFID tag reader. When an RFID tag reader detects a passive RFID tag, the location of the reader at the time of this detection is associated with the scanned RFID data stream to provide approximate location of the RFID tag. Additionally, a further refined estimate of the RFID tag position can be determined by combining information about relative power of the measured tag data with the location and attitude of the tag reader.

Indoor/Outdoor Logistics Applications

An alternative embodiment of the present invention provides for advantages in logistics in intermodal transport, engineering and construction. Such applications benefit from real-time tracking and management of assets moving in and out of obstructed environments. For example, a Zigbee or GNSS solution integrated as taught in the present invention enables broad use of the technology in locating and communicating with assets throughout a localized area in three dimensions.

The present invention is also uniquely suited for this application given its inherent capability for self-configuration and calibration. An SCT communications unit no larger than a cell-phone may be used to quickly survey multiple points faster than is possible with theodolite technology or GNSS alone. Further, working in a similar fashion to a laser level, an SCT communications unit can determine horizontal and vertical alignment of any structural component to the sub-centimeter level relative to any desired reference point.

For site logistics, a similar cell-phone sized device (potentially supporting voice as well) may provide real-time tracking of people and assets throughout the entire construction site, including to places where a GNSS based solution is unreliable or totally unavailable. With integrated telemetry, the system becomes a powerful tool for coordination and monitoring of site activities. With support for mesh networking, sites of virtually any shape and size can be easily covered and managed centrally without the on-going expense of a wide-area wireless solution (for example a GSM/GPS solution).

Healthcare Applications

Alternative embodiments of the present invention may be readily applied in health care facilities. For example, an SCT communications unit integrated with either Zigbee or WiFi may provide real-time monitoring of patients and assets. Supervisory and patient services staff need the capability to locate doctors, nurses, patients and mobile equipment within the hospital facilities. Patients with severe mental illness pose a serious challenge if they move outside a geo-fence, and alarms could be activated in such situations to restrict the patient's further travel and provide the location of the patient for retrieval by staff. Patients on gurneys can also be easily located—critically important if they spend significant time outside of assigned areas, such as during emergency management or in situations when patients exceed hospital bed capacity. Further, with support from GNSS signals, the SCT communications unit can notify managers when patients leave the healthcare facility boundaries without authorization or discharge. This is particularly useful for Alzheimer patient tracking.

Alternatively, another embodiment for healthcare applications would be to equip selected staff members with a portable RFID reader equipped with an SCT such that the approximate location of passive tags can be determined through ad-hoc sampling. In this embodiment, the staff members would proceed through normal activity, where the SCT equipped reader would regularly poll for passive RFID tags, any received responses would be tagged with the current time and location as calculated by the present invention.

Location Commerce Applications

With the combined capabilities for simultaneously processing both GNSS and local area RST signals, the present invention enables high-precision location commerce applications both in obstructed areas and where GNSS typically provides services (e.g. outdoors). An alternative embodiment of the present invention is to equip consumer communication devices such as cell phones and other mobile devices with SCT functions such that location can be determined both in large geographic regions as well as in localized areas such as a shopping mall. The SCT equipped communication device can be used to identify the location of an individual enabling the delivery of location specific content relevant to the individual's precise location. With minimal cost, the present invention performs both wide area positioning and local area positioning simultaneously, yielding accuracy and positioning information where GNSS alone is unable to function. Unlike current location commerce applications using GNSS/network assisted location services, this alternative embodiment of the present invention allows the individual to be pinpointed with meter level accuracy indoors and outdoors. Further, the present invention can smoothly transition from local area positioning to wide area GNSS without loss of coverage. For example, given a store that has deployed an array of RST beacon units for the purposes of position, information regarding the selection of goods and services in the immediate vicinity can be delivered to an individual with an SCT equipped cell-phone; this information may include advertisements, product information, coupons, purchase statistics, and ratings. Further, in this embodiment, the communications network already supported in the device can be used to transport the location relevant content.

Emergency Services Applications

In a situation such as post-Katrina New Orleans where there was no surviving regional communications networks, the present invention with its integrated communications infrastructure may provide a telemetry network and accurate tracking of first responders, vehicles, supplies, and other key mobile assets. In this embodiment, the SCT communications unit is integrated with Zigbee and P25 VHF to form a robust local area and wide area location and communications management solution. This embodiment enables real-time monitoring of rescue workers as they enter buildings during search and recovery and to provide for regional monitoring when out of doors (via GNSS). Alarms could be triggered in the event of the absence of a first responder's lack of movement, which may be indicative of an emergency situation.

Aerial Search and Rescue (SAR) Applications

An alternative embodiment of the present invention may be utilized for search and rescue operations. In one example, two SCT communication units may be deployed into an airborne environment (either free flyers or one flyer and one towed package). Each SCT communication unit is configured to process GNSS signals simultaneously with RST ranging signals. A beacon unit is deployed with a victim that to be located. The beacon unit transmits an RST ranging signal that may be received overhead. In certain situations, the victim may be deep within a forested environment, buried in the snow, or in some obstructed environment that prevents normal use of GNSS sensors.

The ground segment (GS) consists of a pair of UAV controllers of these airborne platforms and a Zigbee two-way communications subsystem that controls airborne operations and retrieves the SCT observables from the UAVs. The ground segment also has a conventional GNSS receiver that allows the acquisition of GNSS orbits and time. A ground processor receives Zigbee downlinks, determines the dynamic inter SCT communication units baseline vector separation, beacon delta phase and derives the intersected hyperboloids that gives the beacon's ground location which is associated with the victim under debris (i.e., an avalanche or collapsed building).

These UAVs may be very small type model aircraft, which could be considered as expendable assets, depending upon circumstances. A minimum of two UAVs flying in the area of interest are enough to be able to find the beacon with several meter accuracy after a few minutes of flying above the general region of interest. When the SAR team arrives in the general region as indicated by the airborne segment, a hand-held SCT-type receiver as described in the present invention, can be operated in a total power detection mode, which will provide meter level accuracy guidance for digging and effecting the actual rescue operations.

Figure 11:
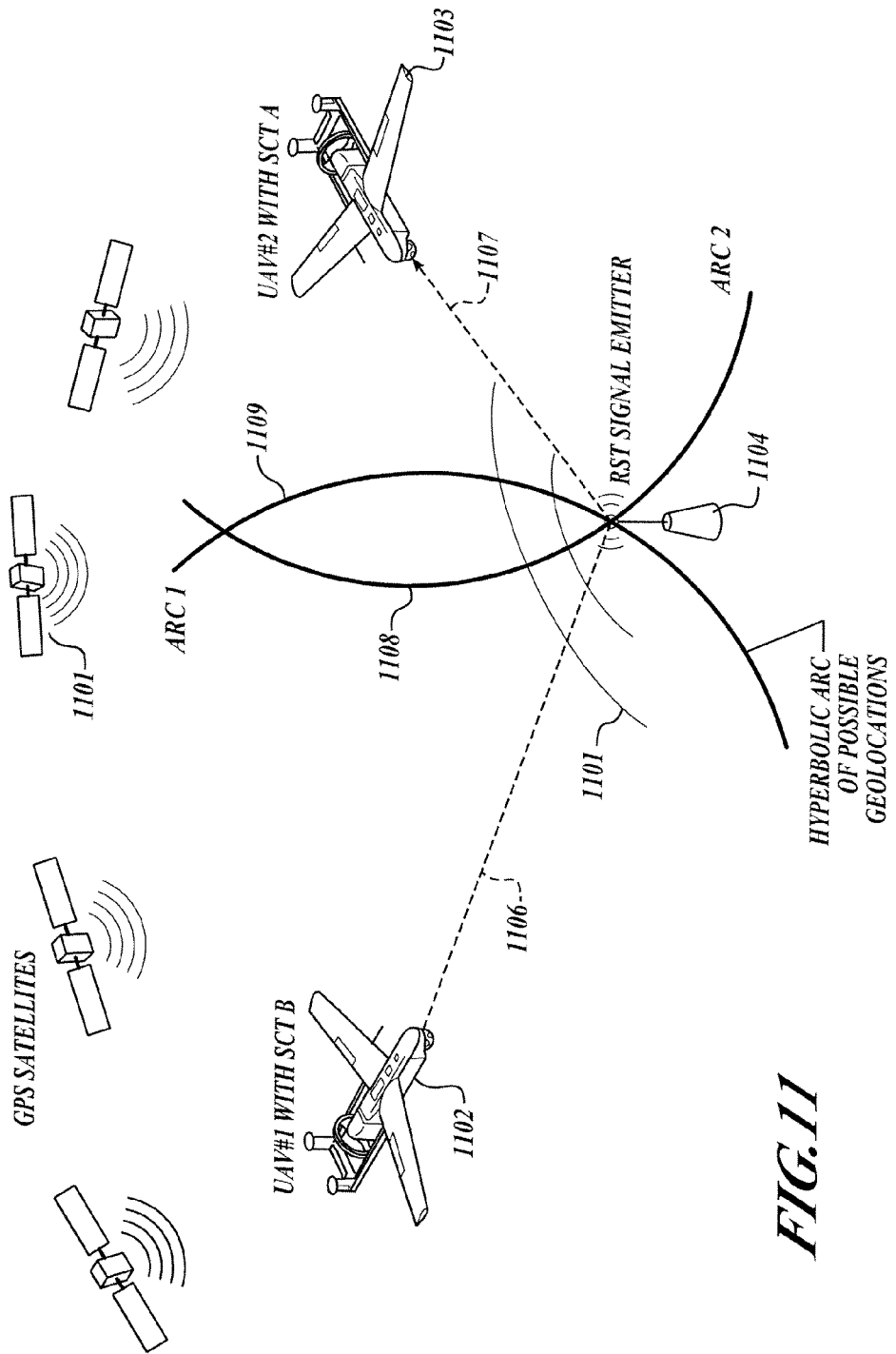
FIG. 11 illustrates an application of the invention for search and rescue operations in accordance with an embodiment of the present invention.

FIG. 11 illustrates an alternative embodiment in which the present invention is utilized for search and rescue operations. In this embodiment, an RST signal emitter 1104 is placed with an asset or person to be tracked and located in case search or rescue is required. The RST beacon produces ranging signals 1101 that are intercepted by SCT units 1102 and 1103 located on unmanned aerial vehicles or other flying platforms. Utilizing the techniques described previously herein, range measurements 1106 and 1107 are determined between the flight platforms 1102 and 1103 and the asset to be located 1104. The UAVs 1102 and 1103 also simultaneously receive data from a GNSS satellite constellation 1101, which can be used to determine an autonomous location at the time that they intercept the RST ranging signals 1101. Each range measurement combined with location of the observing SCT produces a hyperbolic arc of possible location of the emitter. For example, if the location of the UAV 1102 is known from GNSS data 1101, and a range 1106 is determined between the UAV 1102 and the emitter 1104, it is possible to say that the emitter is located on a hyperbolic arc of position 1108. Simultaneous observation of a second such arch 1109 can be used to determine the location of the emitter 1104 that lies on one of the two possible intersections of these arcs 1108 and 1109. In search and rescue operations, one of these two intersection points can generally be discarded as out of plane, and the asset located.

Maritime Station Keeping and Close-Quarters Navigation

An alternative embodiment of the present invention involves tug and barge towing operations at-sea and during approach to locks. The beacon allows phase-stabilized GNSS sensors on tug, at lock entrance and at multiple points on barge(s).

The tug would provide the beacon reference signal (perhaps in the 2.4 GHz ISM band) to phase-lock the barge GNSS sensors. The tug also has a 915 MHz ISM band receiver to receive the primary reference signal from the lock, if it was available. The lock also has a GNSS receiver driven by the lock reference source that is being broadcast to the tug and others vessels as required. GNSS sensor data is also acquired using the same ashore reference oscillator. The lock reference signal at 915 MHz would be used to phase-lock the tug GNSS sensor and then the tug reference beacon at 2.4 GHz, which phase-locks the multiple GNSS sensors on the barges. If the tug is out of range of the 915 MHz ashore lock reference signal, the tug internal reference is the source to phase-locked array of GNSS sensors on the barges. All GNSS sensor data, from ashore, the barges and the tug, are collected and processed at the tug. This phase coherent array is processed in real-time with an accuracy of better than 30 cm and in the Earth-centered Earth-fixed coordinate system of the WGS 84. Aboard the tug, position and velocity situational awareness information can be available at the tug's bridge control. The low cost architecture allows the formation of an affordable system that is unachievable by other means.

On-Orbit Operations-Mother Satellite with Orbiter Daughter Satellite

An alternative embodiment of the present invention involves relative positioning in space of a daughter satellite, which is co-orbiting with another main satellite at altitudes where GNSS signals are unavailable. Small nano-powered beacons are placed on the mother satellite at known locations of opportunity. These known beacon locations form the frame of reference for positioning of sub-satellites. All of these beacons are time synchronized and phase-coherent relative to the mother satellite internal time and frequency reference source. The daughter satellite moves around in the vicinity of the mother satellite. The observables are the phase ranges from the various beacon signals arriving at the daughter satellite. The observables would be linked back to the mother satellite for processing. Four or more observables are required in order to estimate the 3-D position of the daughter satellite and to synchronize the daughter internal time reference source. Depending upon the distance separation between the mother/daughter, the GDOP parameter will be a significant issue because as the daughter will tend to view these multiple beacons as a point source at a distance of approximately twenty times the maximum separation between the beacons on the mother satellite. For a five meter maximum beacon separation at the mother satellite, and with a few millimeter range measurement precision at the daughter satellite, the 3-D position of the daughter satellite relative to the mother can be estimated with a precision of a approximately 20 cm at a 100 m separation between these satellites.

Low-Cost 3D Land Survey System

An alternative embodiment of the present invention may be utilized for low cost land surveying systems. A common beacon is used to phase-lock all GNSS sensors, which cross-link their SCT data to a central processor. The central processor has satellite orbits and GNSS time. Pseudo range and carrier phase data types provide millimeter precisions over kilometer scale operations. Systematic errors due to multipath contamination will be limiting error sources for this method and can be mitigated by special GNSS antennas. On short baselines typically involved in local area construction, the atmospheric errors from the troposphere and the ionosphere will be common-mode self canceling errors. Survey system designs are possible that can reduce multi-instrument system cost by 70% to 90% relative to currently available instruments.

Precision Takeoff/Landing for Shipboard Rotary Wing Aircraft

An alternative embodiment of the present invention may be utilized for positioning during takeoff and landing of rotary wing aircraft operating in shipboard environments. Conventional GPS based tracking systems contain significant limitations for such applications due to the inability of a conventional GPS receiver to decode the 50 bps navigation data stream, and due to the potential for interference from other shipboard navigation and communication systems. The technology of the present invention mitigates these concerns by placing RST beacons on the ship super structure, and SCT receivers on the aircraft. The system and method do not require decoding of a data stream to determine beacon position for operation, and frequency of operation can be adjusted to minimize interference with other systems. Additionally, the rapid update rate of the present invention handles the relevant dynamics of both the ship and the aircraft.

Augmented GNSS Aircraft Precision Approach

An alternative embodiment of the present invention may be utilized for augmenting aircraft precision approach and landing operations. A local RST network is placed around the runways of a landing strip. SCTs aboard the aircraft recover beacon data and utilize this data to augment positioning from GNSS or other means. The data can be processed in a combined solution, and there is no interference between the RST beacon system and GNSS systems because the RST frequencies are adjustable. This application can be applied to land based aircraft landing strips and to shipboard applications such as fighter aircraft deployment from a Navy aircraft carrier. The high update rate available with the RST beacon and SCT receiver handles the extreme dynamics of such an aircraft.

Yet another alternative embodiment of the present invention is to provide a rapid deployment and recovery capability for aircraft without reliance upon GNSS signals. The embodiment would function without reliance upon GNSS signals being available to support air operations. A reference SCT at the airstrip provides RST beacon calibration data, which is up-linked to the aircraft. The aircraft receives the ground-based beacons and the reference site calibration data and processes an estimate of the position and velocity of the aircraft relative to the ground based system from several beacons surrounds the airstrip. In this configuration, each aircraft has its own navigation processor and remains in an emission silent mode.

The system horizontal positioning accuracy will be limited by the RST beacon position calibrations at approximately 10 cm. Because these RST beacons will tend to be co-planar, the horizontal dilution of precision (HDOP) will be good at near unity; however, the vertical DOP for the aircraft will be in the domain of a factor of 10 to 20. Because the system has high precision of a few centimeters, the aircraft vertical precision estimate to be within a meter over a broad domain of altitudes as the aircraft approaches the airstrip. Placement of one or more RST beacons out of plane with the rest of the beacons will improve precision in the vertical estimates. As a backup, when the aircraft comes to an altitude of approximately 5 meters, an acoustic RST could be activated with an acoustic mode SCT that would provide altimetric accuracy of a few cm and with low probability of detection that will allow the aircraft to flare for touchdown.

The aircraft can also carry three beacon receivers to provide an attitude determination capability. These attitude receiver antennas would be located on the underside of the aircraft probably at each wingtip and at the aft end of the fuselage. The aircraft processor would compute the phase differential arrival from each beacon and be capable of determining the aircraft attitude with an accuracy of a few degrees depending upon the specific aircraft geometry relative to the ground beacons.

Airport Ground Tracking and Monitoring System

An alternative embodiment of the present invention may be utilized for airport ground tracking and monitoring systems. In this application, the present invention will function inside of buildings such as hangers, and in obstructed areas where GNSS navigation alone will be unreliable. When an aircraft which has been in an enclosed environment for a significant period of time exits the hanger, there may be a substantial amount of time required for the GNSS receivers to begin positioning. This application provides aiding data of position and time to such receivers, and thus enhances runway incursion detection and collision avoidance alerting. Further, this application enables centralized monitoring and secure data base development of tracked assets.

Local Area Location Authentication

In yet another alternative embodiment of the present invention, the signals transmitted by the RST can be used to authenticate the location of an SCT by processing the observed data captured by the SCT together with Reference SCT observables to determine if the SCT is at the a priori known location of the SCT. The observables collected by the SCT to be authenticated contain useful information unique to the location (the location signature) that can be authenticated by observing the current state of the RST array via the Reference SCT and the observed errors in the location signature. The fact that a plurality of RSTs are unsynchronized and phase incoherent in their PRN chipping relative to each other requires continuous calibration of the RST array but brings with it a security attribute in that an adversary could not predict well enough the various code phases or chipping rates to achieve sub-meter precisions. The reference SCT, which is presumed to be protected, will sense and report what is actually happening with the RST array. This is a very useful attribute because these unpredictable features makes the present invention the way to implement location authentication in GNSS obstructed environments. Additionally, with the present invention's capability to process GNSS signals, it can also provide GNSS derived location signature data as well.

Design Considerations

The analysis of the transmission power levels, battery consumption, identification and differentiation of beacon signals and other characteristics has been carried out for variations of the preferred embodiment. These are detailed in the following sections, which are provided solely to demonstrate present implementation of various and alternative embodiments of the present invention.

RST Beacon/SCT Receiver Design Considerations

The coarse channel receiver self noise assuming a 3 dB noise figure low noise amplifier will be: KTB noise power= $(1.38 \times 10^{-23}$ W/Hz-K$)(300$ Kelvin$)(2 \times 10^6$ Hz$)=8.2 \times 10^{-15}$=−140 dBW=−110 dBm.

Consider a 0.1 micro-Watt ($1 \times 10^{-7}$ W) beacon power at a distance of 3 km.

Beacon flux at distance D, $P_{rec}=P_{xmtr}/(4$ pi $D^2)$, $P_{rec}=(1 \times 10^{-7}$ W$)/4$ pi $(3000)^2=9 \times 10^{-16}$ W=−150 dBW=−120 dBm.

Beacon signal power=−120 dBm. Post-LNA SNR=−120−(−110)=−10 dB

Delay and multiple (D&M) processor squares the signal & noise so that SNR D&M=−20 dB.

Assuming a beacon with a 1.023 MHz chipping frequency and an SCT FFT processor with a 1 second time series has 1.0 Hz bin width and an effective Process Gain, Gp=2 MHz/1 Hz=63 dB.

Overall system power SNR=63 dB−20 dB=43 dB or 22 dBV amplitude SNR=140:1.

The FFT phase noise estimate is the reciprocal of the voltage SNR, so the phase noise=$7 \times 10^{-3}$ radians=0.4 degrees=1 milli-cycle.

The beacon with a PRN chipping rate of 1.023 MHz, 293 m wavelength. The 1 milli-cycle precision will provide a 30 cm Coarse channel phase ranging precision.

Consider now the precision channel receiver self noise assuming a 3 dB noise figure low noise amplifier will be: KTB noise power=$(1.38 \times 10^{-23}$ W/Hz-K$)(300$ Kelvin$)(20 \times 10^6$ Hz$)=82 \times 10^{-15}$=−130 dBW=−100 dBm.

Consider a 0.1 micro-Watt($1 \times 10^{-7}$ W) beacon power at a distance of 3 km.

Beacon flux at distance D, $P_{rec}=P_{xmtr}/(4$ pi $D^2)$, $P_{rec}=(1 \times 10^{-7}$ W$)/4$ pi $(3000)^2=9 \times 10^{-16}$ W=−150 dBW=−120 dBm.

Beacon signal power=−120 dBm. Post-LNA SNR=−120−(−100)=−20 dB.

Delay and multiple (D&M) processor squares the signal & noise so that SNR D&M=−40 dB.

Assuming a Beacon with a 10.23 MHz chipping frequency and an SCT FFT processor with a 1 second time series has 1.0 Hz bin width and an effective Process Gain, Gp=20 MHz/1 Hz=73 dB.

Overall system power SNR=73 dB−40 dB=33 dB or 16.5 dBV amplitude SNR=50:1.

The FFT phase noise estimate is the reciprocal of the voltage SNR, so the phase noise=$2 \times 10^{-2}$ radians=1.2 degrees=3.2 milli-cycle.

The beacon with a PRN chipping rate of 10.23 MHz, 29.3 m wavelength. The 3.2 milli-cycle precision will provide a 9 cm precision channel phase ranging precision.

Battery Power Requirements

The beacon power requirements will be dominated by the digital circuitry and not the very low power of the 0.1 micro-Watt beacon transmitted. The beacon will require approximately 40 mW assuming 1.8 V logic. Consider a 3.3 V Lithium-Manganese battery of 1500 mA hour capacity with the voltage falling to 1.5 V in 50 hours or about two days. The power source could also be batteries with a solar recharge if in an outdoor situation or powered from conventional building power with a battery backup to provide for continuous operations.

Beacon Identification

The beacon identification will be by its frequency offset from the nominal 1.023 MHz coarse channel chipping rate with multiples of 5 Hz spacing offsets between beacons. Thus, for a hundred beacons, the processor would have a total search interval of +/−250 Hz centered at 1.023 MHz. Once a particular beacon chipping rate was identified, the processor would refer to the registry data base to determine to what person or asset the identified tag had been assigned.

Similarly for the Precision channel the beacon identification will be by its frequency offset from the nominal 10.23 MHz Precision channel chipping rate with multiples of 50 Hz spacing offsets between beacons. Thus, for a hundred beacons, the processor would have a total search interval of +/−2500 Hz centered at 10.23 MHz. Once a particular beacon chipping rate was identified, the processor would refer to the registry data base to determine to what location, person, or asset the identified beacon had been assigned.

ISM Band Implementation

In an alternative embodiment, an RF implementation with each beacon transmitting multiple phase coherent channels of direct sequence spread spectrum signals is described. For example, to achieve positioning within a confined environment where the receiver device is a priori location is known within 500 meter, there is a channel with a chipping rate of 1.023 kHz (wavelength of 3 km). With a location sensor implementing a spectral compression delay and multiply operation and a resultant amplitude signal to noise ratio of 20 to one, the phase noise will be 0.05 radians or 2.8 degrees or 7.9 milli-cycles or 24 meters.

With a second channel with an SNR of 20 and a chipping rate of 1.023 MHz, the phase range precision is 2.4 meters. With a third channel with an SNR of 20 and a chipping rate of 10.23 MHz, the phase range precision is 24 cm. With a fourth channel with an SNR of 20 and a chipping rate of 102.3 MHz, the phase range precision is 2 cm.

The estimated SNR of 20 is very modest and effective SNR at 100 could be more reasonable. In this higher signal case, the 10.23 MHz chipping rate channel would yield 5 cm precision. By U.S. regulations, the ISM bands are:

5725-5875 MHz (150 MHz center frequency 5800 MHz)

2400-2500 MHz (100 MHz center frequency 2450 MHz)

902-928 MHz in Region 2 (26 MHz center frequency 915 MHz)

Beacon locations can be expressed in the WSG 84 coordinate system to maintain a consistent frame of reference with the GNSS. Thus, the resulting physical state estimates could express the positions in the GNSS frame as if they had clear lines of sight to the GNSS satellites.

Application to Positioning in a Large Area

In an alternative embodiment, application is in reference to an area defined 100 m by 100 m (10,000 square meters, 110,000 square feet). The maximum horizontal distance that a location sensor could be away from a beacon is approximately 141 meters. Consider a design for a spectral compression system with an intercepted phase measurement precision of 3 cm. With a maximum chipping rate of 10.23 MHz, there is a 29.3 m wavelength. A 3 cm precision requires 0.1% of a cycle (0.36 degrees) phase measurement precision or 6.3 milliradians. Six milliradian phase precision requires FFT amplitude SNR of 160 or 44 dB signal power.

Telecommunications Considerations for the Present Invention

In an alternative embodiment, various test cases may be described.

Test case: ISTAC 2002 Codeless GNSS Land Surveyor

The receiver self noise assuming a 1.5 dB noise figure low noise amplifier will be: KTB noise power=$(1.38\times10^{-23}$ W/Hz-K)(120 Kelvin)($2\times10^6$ Hz)=$3.3\times10^{-15}$=−145 dBW=−115 dBm.

GPS C/A channel signal power=−130 dBm. Post-LNA SNR=−130−(−115)=−15 dB.

Delay and multiple processor squares the signal & noise so that SNR D&M=−30 dB.

FFT processor with 40 second time series has 0.025 Hz bin width, effective Process Gain, Gp=2 MHz/0.025 Hz=79 dB.

Overall system SNR=79−30=49 dB or 25 dBV amplitude SNR=316:1 in good agreement with the actual C/A channel performance of the ISTAC 2002 Land Surveyor product.

Near-Far Degradation in a Warehouse Environment

In an alternative embodiment, a near-far degradation in a warehouse environment may be described.

At the nearest, the 1 nano-W beacon might be within 10 m of the remote receiver.

Beacon flux at distance D, $P_{rec}=P_{xmtr}/(4\ pi\ D^2)$, $P_{rec}=(1\times10^{-9}$ W)/4 pi $(10)^2$=$8\times10^{-13}$ W=−121 dBW=−91 dBm.

A beacon at 141 m will present −114 dBm while a beacon 10 m away will present −91 dBm. Thus, the near-far problem is the absolute value of −91 dBm minus −114 dBm=23 dB. With 12 bits of analog to digital conversion the receiver will have 72 dB of dynamic range and allows a 49 dB of margin to accommodate other relatively higher power in-band signals that could shift the noise floor.

Simplicity of Receiver

An advantage of using a spread spectrum approach for beacons is to radiate the least amount of power, reducing DC power requirements for beacons that may be battery powered for operations over long periods of time. The spread spectrum utilization affords a high level of immunity to strong in-band signals that would otherwise present substantial interference with a conventional signaling modality.

Generalized System Architecture and Method

The previous discussions of the various embodiments of this system and related methods for physical state estimation in configured environments show the broad applicability to a wide variety of applications. The system and method disclosed and taught above may be summarized in the following description of a generalized architecture, which reduces the system to its canonical form essentially comprised of emitters, interceptors implementing spectral compression and a physical state estimator and covers most if not all possible implementation architectures. The form also teaches that through proper design and construction, the preferred embodiment of the present invention can be easily adapted to support a broad spectrum of applications, configurations, and environments.

Figure 12:
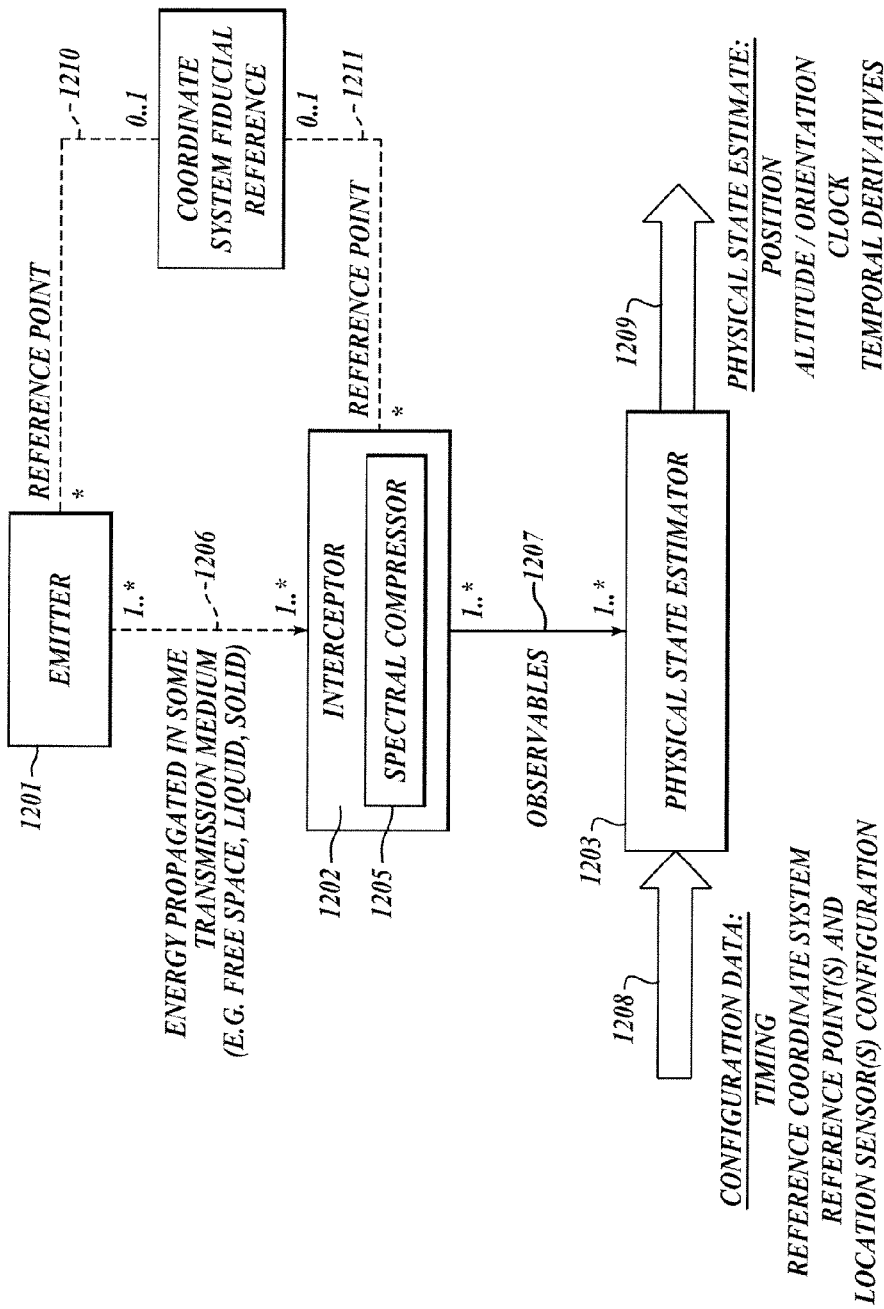
FIG. 12 is a logical systems diagram showing the components of the invention including an emitter, interceptor and physical state estimator used to determine physical states using intercepted energy in accordance with an embodiment of the present invention.

FIG. 12 illustrates the canonical form of the preferred embodiment of the present invention detailing the essential relationships between the systems basic elements. At least one or more emitters 1201 are known to the system, which emit energy that propagates through a transmission medium 1206. These emissions are intercepted by at least one interceptor 1202 and processed by at least one of the methods of spectral compression by the spectral compressor 1205. The resultant observables 1207 from at least one interceptor are communicated by some communication means to a physical state estimator 1203. Configuration data 1208 and the observables 1207 are processed by the physical state estimator to determine one or more members of the relative physical state estimate 1209 between at least one emitter 1201 and interceptor 1202. Observables 1207 from multiple emitters may be used for simultaneous estimates of multiple members of the relative physical state which may include position in the X, Y, and/or Z axis, orientation about some axis, clock bias, and potentially any time derivatives.

Determining an absolute physical state estimate 1209 requires designation of at least one emitter or interceptor as a reference point that has some aspect of its physical state known prior to estimation of the relative physical state. Determination of the absolute physical state 1209 is the addition of relative physical state to the a priori physical states defined by the reference points.

One or more references points defined within the configuration data 1208 can be treated collectively to form a local reference frame for positioning and timing information. Preferably all physical state estimates 1209 are reported within this reference frame. Further, reference points can be associated 1210 and 1211 with a coordinate system fiducial reference 1204 within the configuration data 1208. Through these associations, estimates determined in the internal reference frame can be translated to an external reference frame.

For example, in an indoor applications, a plurality of beacons (e.g., emitters 1201) are first calibrated such that the combination of configuration data and system calibration data enables the beacons to be established as reference points for physical state estimation of a location sensor (e.g., an interceptor 1202). The location of these reference points are then determined in the external WGS-84 reference frame. This can be accomplished in any number of ways through survey, or through direct measurement with location sensors supporting reception of GNSS ranging signal emissions. With these determinations of external fiducial references a transformation matrix can be specified that translates from the internal reference frame to the external WGS-84 frame. In the preferred embodiment, three non-colinear reference points associated with external fiducial points are used to establish a three-dimensional transformation. Once this is accomplished, the resultant estimate of physical state for a location sensor can be reported in the external reference frame. Reporting of time epoch in internal and external time frames such as universal time coordinated (UTC) may be accomplished in the same manner using the time at reference points with respect to the external time frame.

Some emitters may be known to the system but not controlled by the system and considered external. GPS satellites, quasars, communications satellites, television stations and autonomous beacons are all examples of reference points whose existence can be known and monitored but not managed by the system.

Figure 13A:
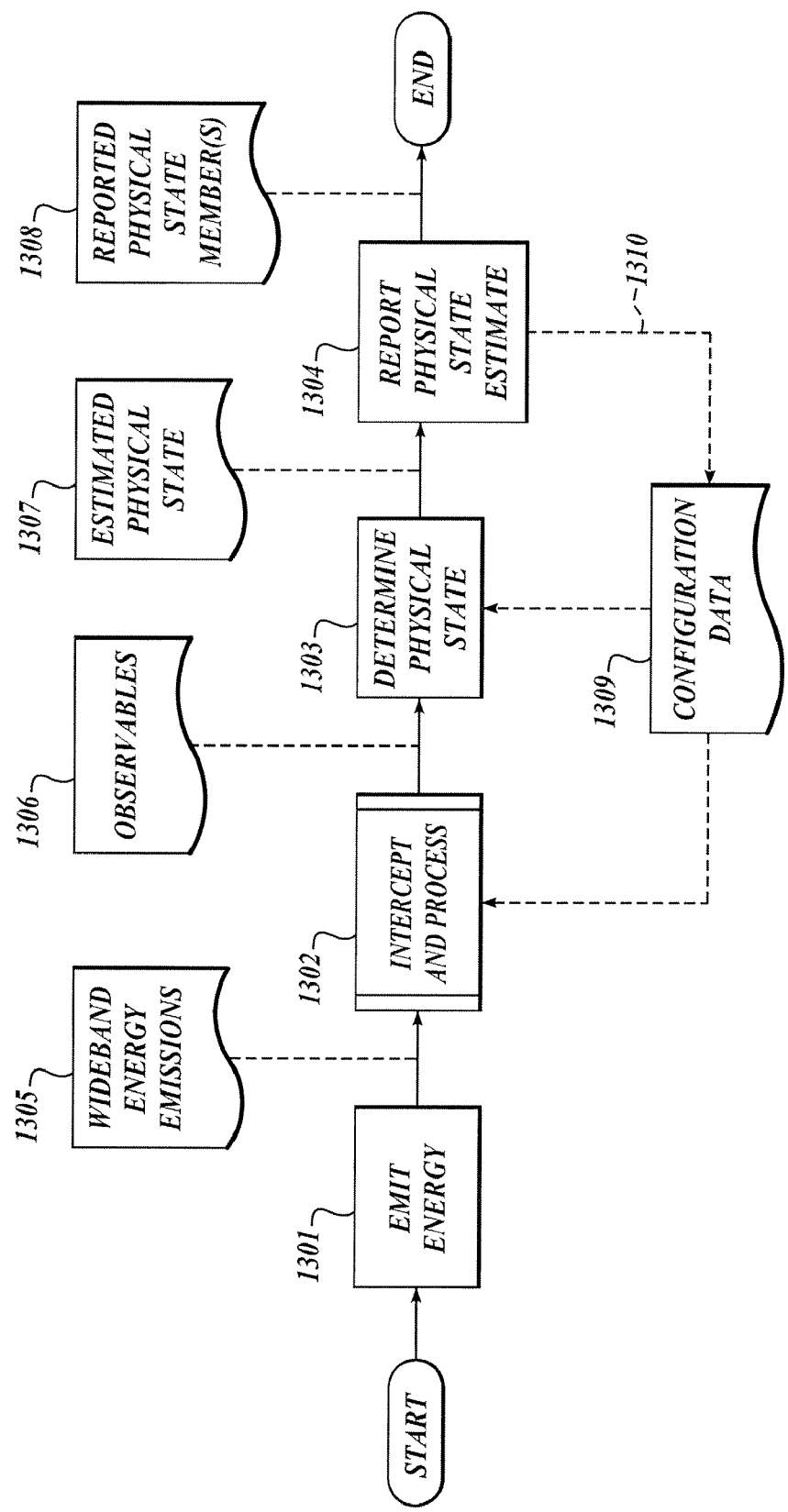
FIG. 13A illustrates a method for providing physical state information within a configured environment in accordance with an embodiment of the present invention.

In the same manner for defining the canonical form of the system architecture, the related canonical form is defined for the method of physical state determination in configured environments. FIG. 13A shows the generalized method of physical state determination in configured environments using spectral compression. Starting with 1301 at least one emitter emits wideband energy 1305 into a propagation medium. These emissions are intercepted and processed at 1302 by at least one interceptor, which produces observables 1306. The processing 1302 applies at least one method of spectral compression. Observables 1306 from at least one interceptor are processed at 1303 to determine the estimated relative physical state 1307 between at least one emitter and the interceptor. These estimated relative physical states are reported at 1304 resulting in a report of physical state 1308 that is externally consumed. The reported physical state may also be used to update 1310 the system configuration data 1309, providing a means to calibrate and adjust system operation in response to changes in the state of various interceptors and emitters. As specified by configuration data, physical state 1308 can be reported either relative to a reference point, in the internally defined reference frame, or in an external reference frame as determined by an externally provided transformation matrix.

From this method, all variations may be derived, and thus it serves to further explain the essential processes at work in all embodiments of the present invention. An important benefit of this generalized method is that the processing is defined without respect to implementation. Constraints of physical location and communication between processing elements 1302, 1303 and 1304 are purely a function of the logical architecture of the system to which the method is embodied. Different physical arrangements of the processing can provide certain optimizations as required. Processing blocks 1302, 1303 and 1304 are most often physically arranged to minimize communication bandwidth and reduce power requirements on the location sensor, as discussed previously herein.

Figure 13B:
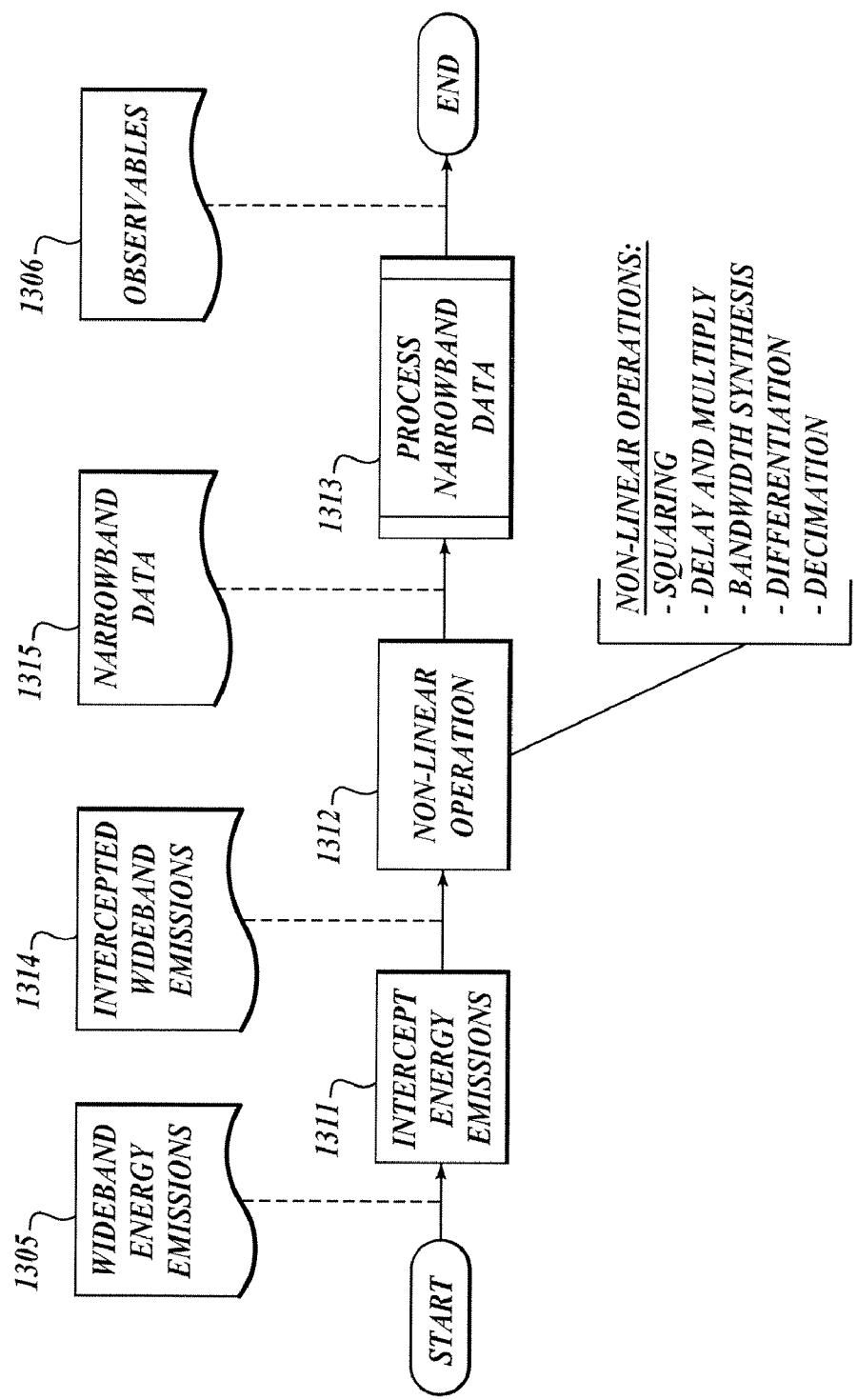
FIG. 13B illustrates the energy emission interception and processing methodology for providing physical state information within a configured environment in accordance with an embodiment of the present invention.

FIG. 13B illustrates in more detail the intercept and process element 1302 of FIG. 13A. Wideband energy emissions 1305 are intercepted at 1311 resulting in the intercepted wideband emissions 1314 that are operated on by some non-linear operation 1312, which produces narrowband data 1315 containing the changing physical characteristics needed to perform physical state estimation. Further processing is performed at 1313, which extracts these useful changing physical characteristics. These result in observables 1306 for the interceptor for at least one epoch. The observables may contain at least one or more of the changing physical characteristics between the interceptor and at least one emitter. For spectral compression, these are most often represented as frequency, amplitude and phase for each wideband emission intercepted and for each instance of a non-linear method applied. Each distinct non-linear operation implementation forms a channel for which multiple wideband interceptions may be observed in 1306. Specific non-linear operations on the intercepted wideband emissions 1314 in 1312 for the interceptor may include but are not limited to: squaring where 1314 is multiplied by itself, delay and multiply where 1314 is multiplied by a delay version of itself and the amount of delay is determined by one of the known or suspected physical characteristics of the wideband energy emission (e.g. the chipping rate of the modulating CDMA PRN spreading function); bandwidth synthesis, where 1314 is sampled in two different bands of a specific bandwidth and frequency offset such that when multiplied together they produce a single resultant narrow band data, where the frequency offset, bandwidth are a function of the physical characteristics of the wideband energy emission; differentiation, where 1314 is differenced with itself producing the approximate first derivative; and decimation, where 1314 sample rate is reduced resulting in a narrowband output that is a fraction of the wideband energy emission. For differentiation, additional derivatives can be produced by further differencing the previous derivative of 1314. For decimation, the decimated output may utilize aliasing or down conversion and low-pass filtering to limit the narrowband data to the band of interest that contains the desired physical characteristics.

Figure 13D:
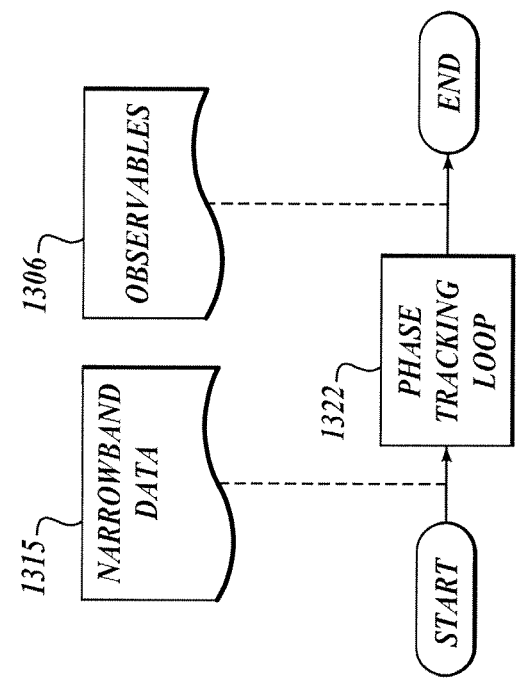
FIG. 13D illustrates a method for narrowband data processing using a phase tracking loop in accordance with an embodiment of the present invention.
Figure 13C:
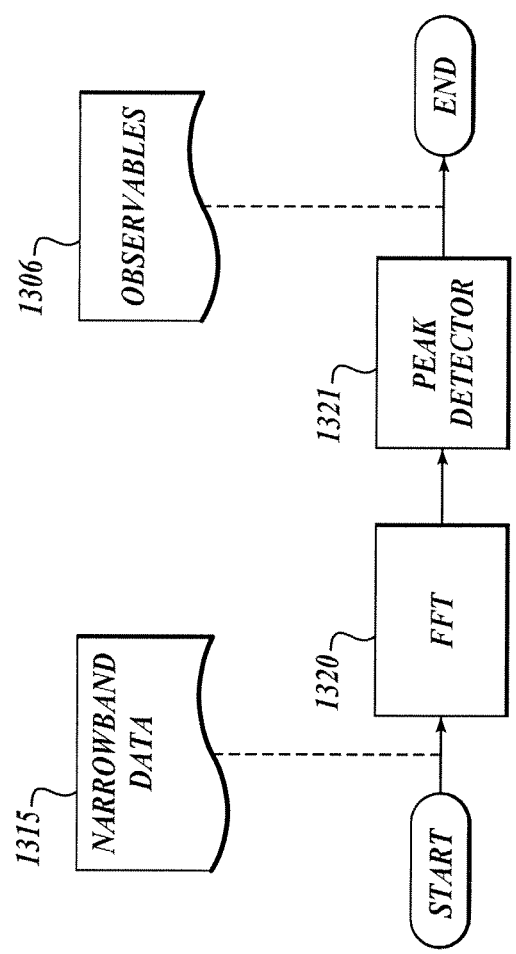
FIG. 13C illustrates a method for narrowband data processing using a peak detector in accordance with an embodiment of the present invention.

FIG. 13C shows one embodiment of the narrowband data processing element 1313 in FIG. 13B. Narrowband data 1315 is operated on by a fast Fourier transform (FFT) resulting in the frequency space transform of 1315 (amplitude, frequency, and phase). These data are then processed by a peak detector which preferably extracts the amplitude, frequency and phase for peak values that meet certain requirements as specified by the configuration data 1309. Typically peaks are selected that meet certain threshold value (e.g. 5 amplitude signal to noise ratio) and frequency range (e.g. must be between −10 and 50 Hz.). The selected peaks for each channel are grouped to form observables 1306, which contains the frequency, amplitude, and phase values for at least one epoch.

FIG. 13D shows an alternative embodiment of the narrowband data processing element 1313 in FIG. 13B. Narrowband data 1315 is processed by at least one or more phase tracking loops 1322, which are configured to track signals corresponding to the expected frequencies contained within the narrowband data. Each tracking loop 1322 outputs frequency, phase and an estimate of signal to noise ratio, together forming a set of observables 1306 for at least one epoch. Various types of phase tracking loops can be implemented depending on the requirements of the particular application. Often, the tracking loop will be implemented with some sort of rate aiding capability enabling a very narrow post-detection bandwidth that can increase integration time resulting in better signal to noise ratio and measurement precision.

Figure 13E:
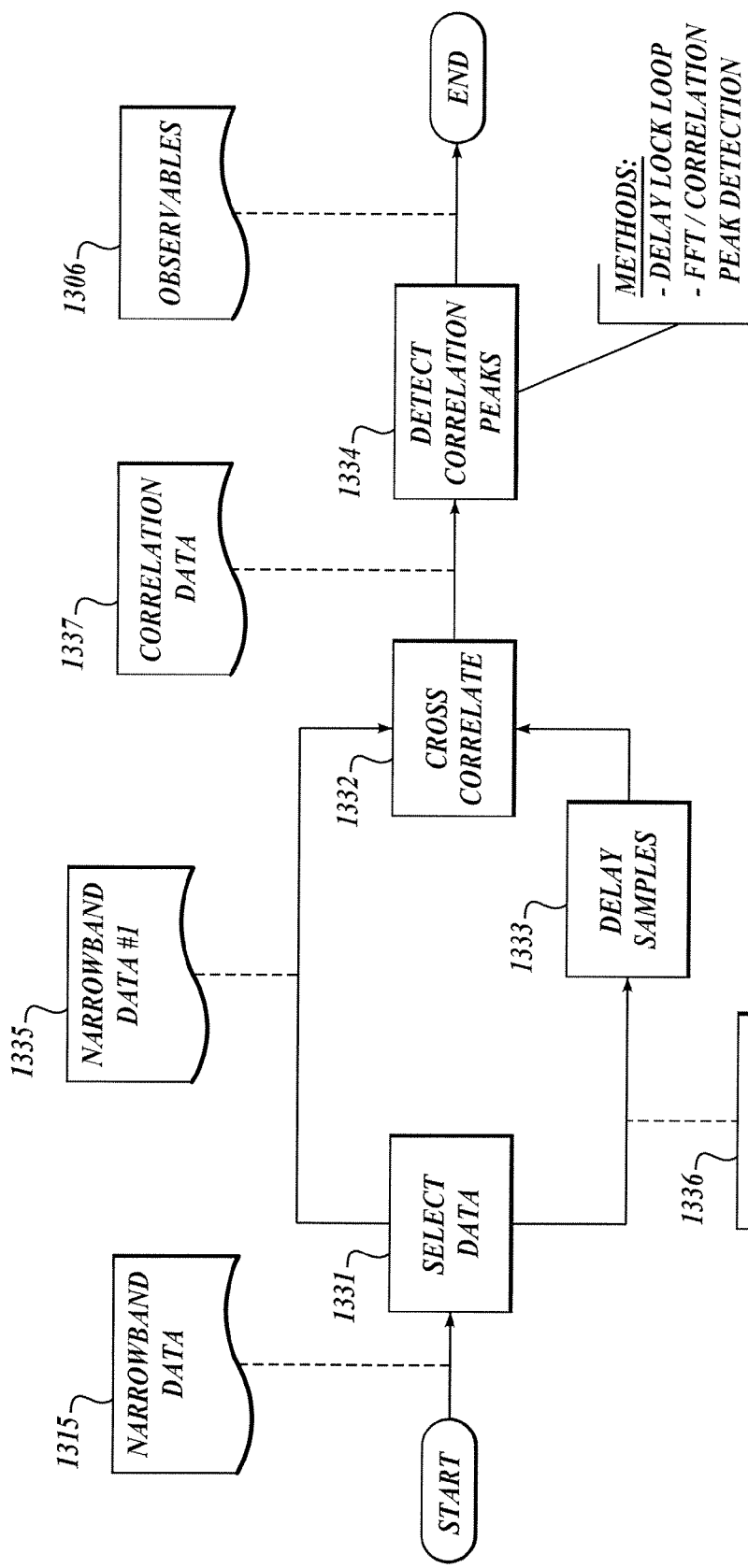
FIG. 13E illustrates a method for narrowband data processing using cross correlation in accordance with an embodiment of the present invention.

FIG. 13E shows yet another alternative embodiment of the narrowband data processing element 1313 in FIG. 13B. Narrowband data 1315 from at least two interceptors are selected in 1331 forming narrowband data 1335 from the first interceptor and narrowband data 1336 data from the second interceptor. Narrowband data 1336 is delayed in time with respect to 1335 by an amount specified by configuration data and/or an amount determined the physical states of the emitters, the first interceptor and the second interceptor. The resultant narrowband data is then cross correlated producing correlation data 1337, which indicates the maximum and minimum correlation values as a function of time. These data are then processed by 1334 detecting the maximum correlation peaks, which results in extraction of changing physical characteristics between the first and second interceptor. 1334 can be implemented in a number of ways but the most common methods are to employ delay locked loops or FFT/correlation peak detection similar to that in FIG. 13C. Observables produce in 1334 are typically frequency, phase, and signal to noise ratio.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A system for providing physical state information, comprising:
   at least one emitter that emits a configured energy emission within a transmission medium, wherein the energy emission is assigned a designated frequency offset that associates the emitter with the emission;
   at least one interceptor that receives the configured energy emission propagated through a transmission medium from the at least one emitter, wherein the interceptor is configured to
      process the received emissions using spectral compression utilizing a non-linear operation to produce a set of observables associated with the at least one emitter suitable for physical state estimation, wherein the set of observables includes the designated frequency offset assigned to the at least one emitter; and
      communicate the set of observables to a physical state estimator; and
   the physical state estimator configured to
      determine at least one member of a relative physical state between the interceptor and emitter based on the set of observables received from the at least one interceptor; and
      report the at least one member of the relative physical state based on the set of observables received from the at least one interceptor.

2. The system of claim 1, wherein the transmission medium is comprised of at least one of a free space, gas and a weak plasma.

3. The system of claim 1, wherein the transmission medium is comprised of solid material.

4. The system of claim 1, wherein the transmission medium is comprised of a liquid.

5. The system of claim 1, wherein
   the interceptor is configured to simultaneously receive both configured and external energy emissions; and
   the interceptor is configured to process received external energy emissions from at least one external emitter using spectral compression utilizing a non-linear operation to produce a set of observables suitable for physical state estimation.

6. The system of claim 5, wherein the external energy emission comprises a structured signal having predetermined general characteristics that can be represented within the system configuration.

7. The system of claim 6, wherein the structured energy emission comprises at least one of a positioning and navigation signal.

8. The system of claim 7, wherein the structured energy emission comprises a signal within a Global Navigation Satellite System.

9. The system of claim 6, wherein the structured energy emission comprises a communications signal.

10. The system of claim 1, wherein the energy emission comprises electromagnetic energy.

11. The system of claim 10, wherein the electromagnetic energy is in the radio frequency or optical bands.

12. The system of claim 1, wherein the energy emission comprises acoustic energy.

13. The system of claim 1, wherein the set of observables produced using spectral compression includes at least one of physical characteristics in the form of amplitude, phase and temporal derivatives of the intercepted energy as it propagates through a transmission medium without regard to the preservation of information content modulated within the energy emissions.

14. The system of claim 1, wherein the physical state estimator is configured to
   reference stored configuration data; and
   use the referenced stored configuration data in determining the at least one member of the relative physical state between the interceptor and emitter based on the set of observables received from the interceptor.

15. The system of claim 1, comprising a plurality of interceptors that receive the configured energy emission propagated through a transmission medium from the at least one emitter.

16. A method for providing physical state information, comprising:
   emitting a configured energy emission from at least one emitter through a propagation medium, wherein the energy emission is assigned a designated frequency offset that associates the emitter with the energy emission;

intercepting the configured energy emission at least one interceptor;

processing the received energy emission using spectral compression utilizing a non-linear operation to produce a set of observables associated with the emission, wherein the set of observables includes the designated frequency offset assigned to the at least one emitter;

receiving configuration data pertaining to the deployment and configuration of at least one of the emitter and interceptor;

determining at least one member of a relative physical state between the interceptor and emitter based on the set of observables and the configuration data; and reporting the at least one member of the relative physical state.

17. The method of claims 16, wherein the set of observables associated with the emission is suitable for physical state estimation.

18. The method of claims 16, wherein the set of observables associated with the emission is used for determining at least one physical characteristics of the emission through the propagation medium.

19. The method of claim 16, wherein processing the received energy emission using spectral compression to produce a set of observables associated with the emission is performed by squaring the energy emission recovering second harmonic amplitude, frequency and phase of the suppressed carrier.

20. The method of claim 16, wherein processing the received energy emission using spectral compression to produce a set of observables associated with the emission is performed by delay and multiply recovery of the characteristics comprising frequency, amplitude and phase of at least one modulation existing over an interval of time within the energy emission.

21. The method of claim 16, wherein:
the received energy emission is a product of differential carrier or modulated sub-carriers; and
processing the received energy emission using spectral compression to produce a set of observables associated with the emission is performed by bandwidth synthesis where at least two modulations within the energy emission are multiplied together to recover the frequency, amplitude and phase of the frequency of the differential carriers or modulated sub-carriers.

22. The method of claim 16, wherein processing the received energy emission using spectral compression to produce a set of observables associated with the emission uses differentiation to recover the frequency, amplitude or phase of any modulations existing over a defined interval of time.

23. The method of claim 16, wherein
the energy emission from an emitter is intercepted by first and second interceptors; and
processing the received energy emission using spectral compression to produce a set of observables associated with the emission is performed by cross-correlation of the emissions intercepted by the first and second interceptors to produce an interferometric response comprising the amplitude, phase and temporal derivatives between the two interceptors.

24. The method of claim 23, wherein
the cross-correlation is performed on at least two distinct frequency channels of the energy emission; and
processing proceeds by differencing at least two interferometric responses to yield a new set of observables including amplitude, phase and temporal derivatives between the two channels such that the phase ambiguity interval is determined by the inter-channel frequency separation.

25. The method of claim 24, wherein the cross-correlation is performed by offsetting in time the energy emission intercepted by the first interceptor with respect to the energy emission intercepted by the second interceptor as a function of the difference in physical state between the first interceptor and the second interceptor.

26. The method of claim 16, wherein the set of observables produced using spectral compression includes at least one of the physical characteristics in the form of amplitude, phase and temporal derivatives of the received energy as it propagates through a transmission medium without regard to the preservation of information content modulated within the energy emissions.

27. The method of claim 16, wherein determining the at least one member of the relative physical state comprises:
estimating the at least one member of the relative physical state between the emitter and the interceptor; and
calibrating the configuration of the at least one emitter and the interceptor using the configuration data.

28. The method of claim 16, further comprising:
estimating the physical state of at least one of the emitter and the interceptor; and
updating configuration data pertaining to the deployment and configuration of at least one of the emitter and interceptor.

29. The method of claim 16, wherein
at least one of the emitter or interceptor is designated as a reference point wherein at least one member of the physical state of the reference point is predetermined; and
at least one of the emitter or interceptor is designated a physical state sensor wherein the physical state of the physical state sensor is determined relative to the physical state of the reference point.

30. The method of claim 29, wherein
the physical state sensor is designated as a second reference point; and
at least one of the emitter or interceptor is designated a second physical state sensor wherein the physical state of the second physical state sensor is determined relative to the physical state of the second reference point.

31. The method of claim 29, where the physical state of the reference point is calibrated relative to an external reference such that the physical state of the physical state sensor can be estimated relative to an external reference frame.

32. The method of claim 29, where a plurality of reference points are assigned to a zone such that the relative physical states of all reference points in the zone are calibrated with respect to each other.

33. A system for providing physical state information, comprising:
at least one configured emitter that emits a configured energy emission within a transmission medium, wherein the energy emission is assigned a designated frequency offset that associates the emitter with the energy emission;
at least one external emitter that emits an external energy emission within the transmission medium;
at least one interceptor that receives configured and external energy emissions propagated through the transmission medium from the at least one configured emitter and at least one external emitter, wherein the interceptor is configured to process the received emissions using spectral compression utilizing a non-linear operation to produce a set of observables suitable for physical state estimation, wherein the set of observables for the configured emitter includes the designated frequency offset that associates the configured emitter with the configured energy emission; and communicate the set of observables to a physical state estimator; and the physical state estimator configured to determine at least one member of a relative physical state between the interceptor and emitters based on the set of observables received from the at least one interceptor; and report the at least one member of the relative physical state based on the set of observables received from the at least one interceptor.

34. The system of claim 33, comprising a plurality of interceptors that receive energy emissions propagated through the transmission medium from the at least one configured emitter and at least one external emitter.

35. A method for providing physical state information, comprising:

emitting a configured energy emission from at least one configured emitter through a propagation medium, wherein the energy emission is assigned a designated frequency offset that associates the emitter with the energy emission;

emitting an external energy emission from at least one external emitter through the propagation medium;

intercepting and processing the configured energy emission at least one interceptor using spectral compression utilizing a non-linear operation to produce a set of observables associated with the configured energy emission;

intercepting and processing the external energy emission at least one interceptor using spectral compression utilizing a non-linear operation to produce a set of observables associated with the external energy emission;

determining at least one member of the relative physical state between the interceptor and emitters based on the set of observables; and reporting the at least one member of the relative physical state.

36. The method of claim 35, wherein intercepting and processing the configured and external energy emissions occurs at the same interceptor.

* * * * *